United States Patent
Katoh et al.

(10) Patent No.: US 10,220,681 B2
(45) Date of Patent: Mar. 5, 2019

(54) REFRIGERATION CYCLE DEVICE FOR VEHICLE

(71) Applicant: DENSO CORPORATION, Kariya, Aichi-pref. (JP)

(72) Inventors: Yoshiki Katoh, Kariya (JP);
Masamichi Makihara, Kariya (JP);
Norihiko Enomoto, Kariya (JP);
Kazutoshi Kuwayama, Kariya (JP);
Kengo Sugimura, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 149 days.

(21) Appl. No.: 14/907,581

(22) PCT Filed: Jul. 22, 2014

(86) PCT No.: PCT/JP2014/003840
§ 371 (c)(1),
(2) Date: Jan. 26, 2016

(87) PCT Pub. No.: WO2015/015754
PCT Pub. Date: Feb. 5, 2015

(65) Prior Publication Data
US 2016/0159204 A1 Jun. 9, 2016

(30) Foreign Application Priority Data

Jul. 31, 2013 (JP) .................................. 2013-158659
Jun. 2, 2014 (JP) .................................. 2014-113931

(51) Int. Cl.
*F25D 17/02* (2006.01)
*B60H 1/32* (2006.01)
(Continued)

(52) U.S. Cl.
CPC .............. *B60H 1/3211* (2013.01); *F25B 1/00* (2013.01); *F25B 49/022* (2013.01);
(Continued)

(58) Field of Classification Search
CPC .......... B60H 1/3211; B60H 2001/3272; B60H 2001/326; F25B 49/022; F25B 1/00; F25B 2600/0251
See application file for complete search history.

(56) References Cited

U.S. PATENT DOCUMENTS 4,487,028 A * 12/1984 Foye ..................... F25B 49/022
165/218
5,018,362 A * 5/1991 Nagase .................. B60H 1/322
62/133

(Continued)

FOREIGN PATENT DOCUMENTS

JP     H11301254 A    11/1999
JP     2005262948 A    9/2005

(Continued)

OTHER PUBLICATIONS

International Search Report and Written Opinion (in Japanese with English Translation) for PCT/JP2014/003840, dated Oct. 28, 2014; ISA/JP.

*Primary Examiner* — Ljiljana Ciric
(74) *Attorney, Agent, or Firm* — Harness, Dickey & Pierce, P.L.C.

(57) ABSTRACT

A refrigeration cycle device for a vehicle has a compressor, a first pump, a high-pressure side heat exchanger, a heating medium-outside air heat exchanger, and a controller. The compressor draws and discharges a refrigerant. The first pump draws and discharges a first heating medium. The high-pressure side heat exchanger heats the first heating medium by exchanging heat between a high-pressure refrigerant discharged from the compressor and the first heating (Continued)

medium. The heating medium-outside air heat exchanger exchanges heat between the first heating medium and outside air. The controller controls operation of the compressor and the first pump. The controller activates the first pump when an activation request of the compressor is made. The controller activates the compressor, after activating the first pump, when it is determined or estimated that a temperature of the first heating medium is lower than or equal to a first predetermined value.

17 Claims, 10 Drawing Sheets

(51) Int. Cl.
 *F25B 1/00* (2006.01)
 *F25B 49/02* (2006.01)
(52) U.S. Cl.
 CPC .......... *B60H 2001/326* (2013.01); *B60H 2001/3272* (2013.01); *F25B 2600/0251* (2013.01)

(56) References Cited

U.S. PATENT DOCUMENTS

| | | | | |
|---|---|---|---|---|
| 5,199,272 A * | 4/1993 | Yamanaka | ........... | B60H 1/3208 62/133 |
| 5,249,559 A * | 10/1993 | Weber | .......... | B60H 1/322 123/339.17 |
| 5,331,821 A * | 7/1994 | Hanson | ........... | B60H 1/322 62/133 |
| 5,417,192 A * | 5/1995 | Choi | .......... | F02D 41/068 123/339.22 |
| 5,546,073 A * | 8/1996 | Duff | .......... | F25B 49/005 165/11.1 |
| 5,617,732 A * | 4/1997 | Albader | ........... | B60H 1/3208 180/53.4 |
| 5,761,917 A * | 6/1998 | Corcoran | ........... | B60H 1/3208 62/133 |
| 5,806,485 A * | 9/1998 | DeGeorge | .......... | B60H 1/322 123/339.17 |
| 5,893,272 A * | 4/1999 | Hanselmann | ........ | B60H 1/3208 62/133 |
| 6,336,335 B2 * | 1/2002 | Ota | .......... | B60H 1/3208 123/198 R |
| 6,553,775 B2 * | 4/2003 | Togaru | ............ | B60H 1/3208 123/339.17 |
| 8,155,833 B2 * | 4/2012 | Lee | .......... | B60H 1/3205 700/275 |
| 8,408,341 B2 * | 4/2013 | Dalum | ........... | B60W 20/10 180/65.22 |
| 2002/0157414 A1 * | 10/2002 | Iwanami | ............ | B60H 1/00778 62/239 |
| 2003/0172667 A1 * | 9/2003 | Takano | ........... | B60H 1/3208 62/202 |
| 2004/0003610 A1 * | 1/2004 | So | .......... | F25B 13/00 62/175 |
| 2006/0032623 A1 * | 2/2006 | Tsubone | ........... | B60H 1/00492 165/202 |
| 2006/0144047 A1 * | 7/2006 | Inaba | ........... | F02N 19/10 60/618 |
| 2006/0225421 A1 * | 10/2006 | Yamanaka | ........... | F02G 5/00 60/645 |
| 2007/0095081 A1 * | 5/2007 | Ootori | ........... | F25B 49/025 62/176.3 |
| 2008/0229768 A1 | 9/2008 | Nakamura et al. | | |
| 2010/0218527 A1 * | 9/2010 | Kitagishi | ........... | F25B 49/025 62/228.5 |
| 2011/0005255 A1 * | 1/2011 | Tanihata | ........... | B60H 1/00785 62/238.7 |
| 2011/0197611 A1 | 8/2011 | Hall | | |
| 2011/0247358 A1 * | 10/2011 | Wada | ........... | F25B 1/10 62/510 |
| 2012/0240604 A1 | 9/2012 | Choi et al. | | |
| 2016/0075213 A1 * | 3/2016 | Sugimura | ........ | B60H 1/00899 62/324.1 |
| 2016/0101666 A1 * | 4/2016 | Sugimura | ........ | B60H 1/00899 165/202 |
| 2016/0159204 A1 * | 6/2016 | Katoh | ........... | B60H 1/3211 62/185 |
| 2017/0008373 A1 * | 1/2017 | Makihara | ........... | B60K 11/02 |
| 2017/0054188 A1 * | 2/2017 | Blatchley | ........... | H01M 10/663 |
| 2017/0349030 A1 * | 12/2017 | Miura | ........... | B60K 11/02 |

FOREIGN PATENT DOCUMENTS

JP 2005265284 A 9/2005
JP 2012201360 A 10/2012

* cited by examiner

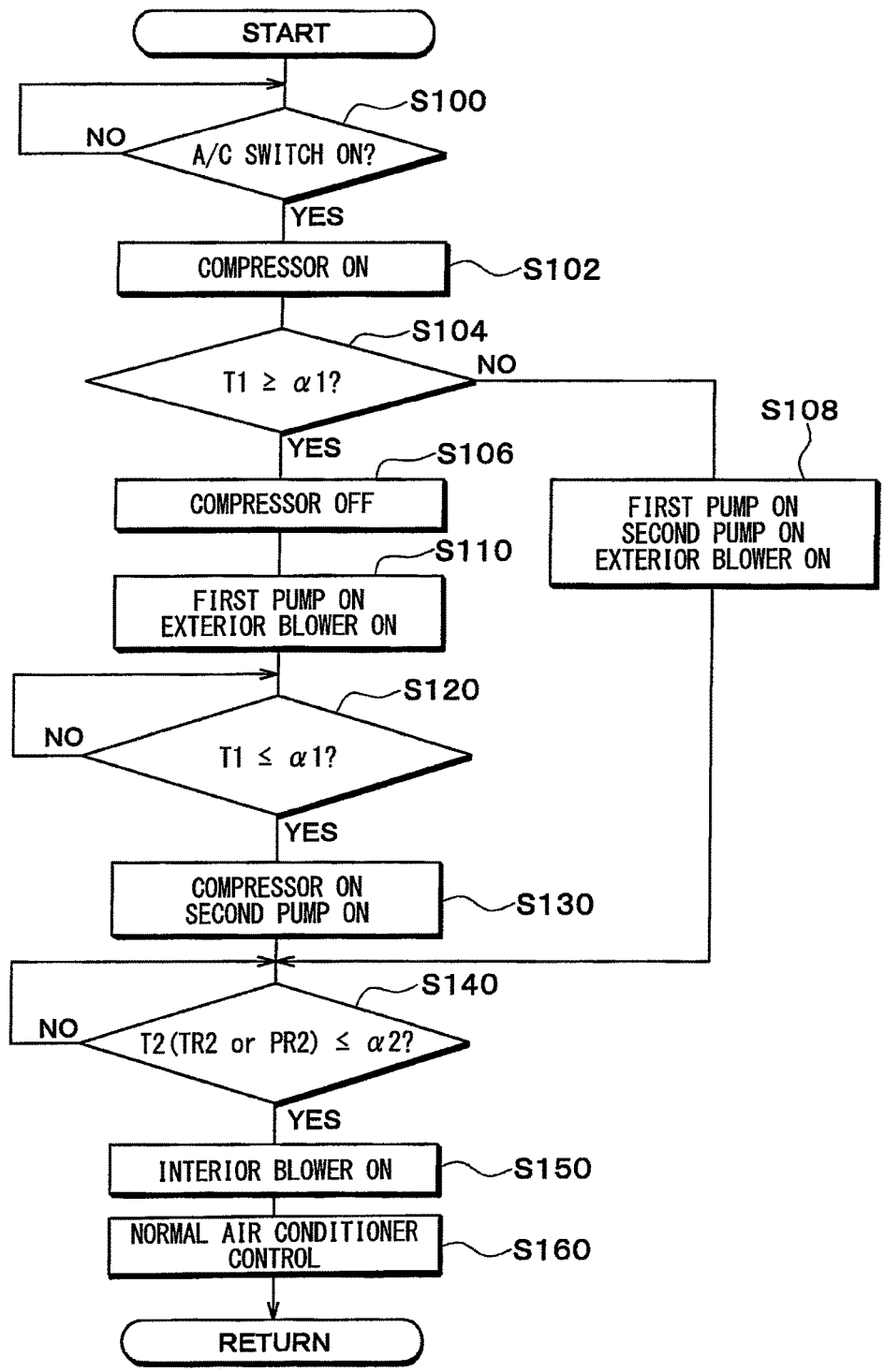

REFRIGERATION CYCLE DEVICE FOR VEHICLE

CROSS REFERENCE TO RELATED APPLICATIONS

This application is a U.S. National Phase Application under 35 U.S.C. 371 of International Application No. PCT/JP2014/003840 filed on Jul. 22, 2014 and published in Japanese as WO 2015/015754 A1 on Feb. 5, 2015. This application is based on and claims the benefit of priority from Japanese Patent Application No. 2013-158659 filed on Jul. 31, 2013 and Japanese Patent Application No. 2014-113931 filed on Jun. 2, 2014. The entire disclosures of all of the above applications are incorporated herein by reference.

TECHNICAL FIELD

The present disclosure relate to a refrigeration cycle device for a vehicle.

BACKGROUND ART

Conventionally, a vehicular heat pump system that includes a water-cooled condenser exchanging heat between a refrigerant and a coolant is described in Patent Literature 1.

In the background art, the coolant is circulated along a cooling line through a water pump, and the coolant is cooled in a radiator through heat exchange with outside air.

PRIOR ART LITERATURES

Patent Literature

Patent Literature 1: JP 2012-201360 A

SUMMARY OF INVENTION

In the above background art, a temperature of the coolant in the cooling line becomes high in a high-temperature environment, such as a case where a vehicle is parked for a long time under the brazing sun in the summer. When a compressor is activated to circulate the coolant in this state, the heat is exchanged between a refrigerant and the high-temperature coolant in a water-cooled condenser. Accordingly, a temperature and pressure of the refrigerant are excessively increased, which has a negative influence on durability of equipment.

In addition, since the coolant in the cooling line has large heat capacity, it is difficult to reduce the coolant temperature at an early stage, and thus it is difficult to reduce the temperature and the pressure of the refrigerant at the early stage.

In view of the above point, the present disclosure has an objective of providing a refrigeration cycle device for a vehicle that can restrict an excessive increase of refrigerant pressure in a high-temperature environment.

Furthermore, in view of the above point, this disclosure has an objective of providing a refrigeration cycle device for a vehicle that can prevent an occupant from feeling uncomfortable due to nearly-uncooled warm air that is blown into a vehicle cabin in a high-temperature environment.

To achieve the above objectives, a refrigeration cycle device for a vehicle according to a first aspect of the present disclosure has a compressor, a first pump, a high-pressure side heat exchanger, a heating medium-outside air heat exchanger, and a controller. The compressor draws and discharges a refrigerant. The first pump draws and discharges a first heating medium. The high-pressure side heat exchanger heats the first heating medium by exchanging heat between a high-pressure refrigerant discharged from the compressor and the first heating medium. The heating medium-outside air heat exchanger exchanges heat between the first heating medium and outside air. The controller controls operation of the compressor and the first pump. The controller activates the first pump when an activation request of the compressor is made. The controller activates the compressor, after activating the first pump, when it is determined or estimated that a temperature of the first heating medium is lower than or equal to a first predetermined value.

According to the above features, the first pump is activated when the activation request of the compressor is made. Thus, the first heating medium can be cooled by exchanging heat between the first heating medium and the outside air in the heating medium-outside air heat exchanger.

Then, the compressor is activated when it is determined or estimated that the temperature of the first heating medium is lower than or equal to the first predetermined value. Accordingly, in the high-pressure side heat exchanger, the first heating medium that has sufficiently been cooled by the heating medium-outside air heat exchanger exchanges heat with the refrigerant. Therefore, excess increase of a temperature and pressure of the refrigerant in a high-temperature environment can be restricted.

A refrigeration cycle device for a vehicle according to a second aspect of the present disclosure has a compressor, a first pump, a high-pressure side heat exchanger, a heating medium-outside air heat exchanger, and a controller. The compressor draws and discharges a refrigerant. The first pump draws and discharges a first heating medium. The high-pressure side heat exchanger heats the first heating medium by exchanging heat between the first heating medium and a high-pressure refrigerant discharged from the compressor. The heating medium-outside air heat exchanger exchanges heat between the first heating medium and outside air. The controller controls operation of the compressor and the first pump. In at least one state of a state that an ignition switch of a vehicle is off and a state that an engine of the vehicle is stopped, the controller (i) activates the first pump when it is determined or estimated that a temperature of the first heating medium is higher than or equal to a third predetermined value, and (ii) stops the first pump, after activating the first pump, when it is determined or estimated that the temperature of the first heating medium is lower than or equal to a fourth predetermined value that is smaller than the third predetermined value.

According to the above features, excess increase of the temperature of the first heating medium in the state that the ignition switch of the vehicle is off or the state that the engine of the vehicle is stopped in a high-temperature environment can be restricted. Therefore, excess increase of a temperature and pressure of the refrigerant can be restricted.

A refrigeration cycle device for a vehicle according to a third aspect of the present disclosure has a compressor, a high-pressure side heat exchanger, a pump, a low-pressure side heat exchanger, a blower, an air-cooling heat exchanger, and a controller. The compressor draws and discharges a refrigerant. The high-pressure side heat exchanger makes a high-pressure refrigerant discharged from the compressor exchange heat. The pump draws and discharges a heating medium. The low-pressure side heat exchanger cools the heating medium by exchanging heat between the heating medium and a low-pressure refrigerant that is after decompressed by a pressure reducer. The blower generates an air flow that flows toward inside of a vehicle cabin. The air-cooling heat exchanger cools the air by exchanging heat between the air and the heating medium that is cooled by the low-pressure side heat exchanger. The controller controls operation of the compressor and the pump. The controller activates the compressor when an activation request of the compressor is made. The controller activates the blower, after activating the compressor, when it is determined or estimated that a temperature of the heating medium is lower than or equal to a predetermined value.

According to the above features, the blower is activated after the low-pressure refrigerant that exchanges heat with the heating medium in the low-pressure side heat exchanger becomes at a low temperature to some extent. Accordingly, when the blower is activated, the heating medium that is cooled to some extent by the low-pressure side heat exchanger cools the air to be blown into the vehicle cabin in the air-cooling heat exchanger. Therefore, an occupant can be prevented from feeling uncomfortable due to a nearly-uncooled warm air that is blown into the vehicle cabin.

A refrigeration cycle device for a vehicle according to a fourth aspect of the present disclosure has a compressor, a first pump and a second pump, a high-pressure side heat exchanger, a heating medium-outside air heat exchanger, a switching section, and a controller. The compressor draws and discharges a refrigerant. The first pump and the second pump draw and discharge a heating medium. The high-pressure side heat exchanger heats the heating medium by exchanging heat between the heating medium and a high-pressure refrigerant discharged from the compressor. The heating medium-outside air heat exchanger exchanges heat between the heating medium and outside air. The switching section switches a connection of the heating medium-outside air heat exchanger between the first pump and the second pump. The controller controls operation of the compressor, the first pump, and the second pump. The controller activates a pump of either the first pump or the second pump that is connected to the heating medium-outside air heat exchanger when an activation request of the compressor is made. The controller activates the compressor, after activating the pump that is connected to the heating medium-outside air heat exchanger, when it is determined or estimated that a temperature of the heating medium is lower than or equal to a first predetermined value.

According to the above features, similar to the case of the above first aspect, the excess increase of the temperature and the pressure of the refrigerant in the high-temperature environment can be restricted.

A refrigeration cycle device for a vehicle according to a fifth aspect of the present disclosure has a compressor, a first pump and a second pump, a high-pressure side heat exchanger, a heating medium-outside air heat exchanger, a switching section, and a controller. The compressor draws and discharges a refrigerant. The first pump and the second pump draw and discharge a heating medium. The high-pressure side heat exchanger heats the heating medium by exchanging heat between the heating medium and a high-pressure refrigerant discharged from the compressor. The heating medium-outside air heat exchanger exchanges heat between the heating medium and outside air. The switching section switches a connection of the heating medium-outside air heat exchanger between the first pump and the second pump. The controller controls operation of the compressor, the first pump, and the second pump. In at least one state of a state that an ignition switch of a vehicle is off and a state that an engine of the vehicle is stopped, the controller (i) activates a pump of either the first pump or the second pump that is connected to the heating medium-outside air heat exchanger when it is determined or estimated that a temperature of the heating medium is higher than or equal to a third predetermined value, and (ii) stops the pump of either the first pump or the second pump that is connected to the heating medium-outside air heat exchanger, after activating the pump that is connected to the heating medium-outside air heat exchanger, when it is determined or estimated that the temperature of the heating medium is higher than or equal to a fourth predetermined value that is smaller than the third predetermined value.

According to the above features, similar to the case of the above second aspect, the excess increase of the temperature of the heating medium in the state that the ignition switch of the vehicle is off or the state that the engine of the vehicle is stopped in the high-temperature environment can be restricted. Therefore, the excess increase of the temperature and the pressure of the refrigerant can be restricted.

A refrigeration cycle device for a vehicle according to a sixth aspect of the present disclosure has a compressor, a pump, a high-pressure side heat exchanger, a heating medium-outside air heat exchanger, and a controller. The compressor draws and discharges a refrigerant. The pump draws and discharges a heating medium. The high-pressure side heat exchanger heats the heating medium by exchanging heat between the heating medium and a high-pressure refrigerant discharged from the compressor. The heating medium-outside air heat exchanger exchanges heat between the heating medium and outside air. The controller controls operation of the compressor and the pump. The controller (i) activates the compressor when an activation request of the compressor is made, (ii) stops the compressor and activates the pump when it is determined or estimated that a temperature of the heating medium is higher than or equal to a first predetermined value after activating the compressor, and (iii) activates the compressor again when it is determined or estimated that the temperature of the heating medium is lower than the first predetermined value after stopping the compressor and activating the pump.

According to the above features, when the activation request of the compressor is made, the compressor is immediately activated. Even in such a case, when the temperature of the heating medium is high, the compressor is stopped, and the pump is activated so as to cool the heating medium.

Then, the compressor is activated when it is determined or estimated that the temperature of the heating medium is lower than or equal to the first predetermined value. Therefore, similar to the case of the above first aspect, the excess increase of the temperature and the pressure of the refrigerant in the high-temperature environment can be restricted.

BRIEF DESCRIPTION OF DRAWINGS

FIG. 10 is a flowchart that illustrates a control process executed by a controller of a refrigeration cycle device for a vehicle in a sixth embodiment.

DESCRIPTION OF EMBODIMENTS

Figure 1:
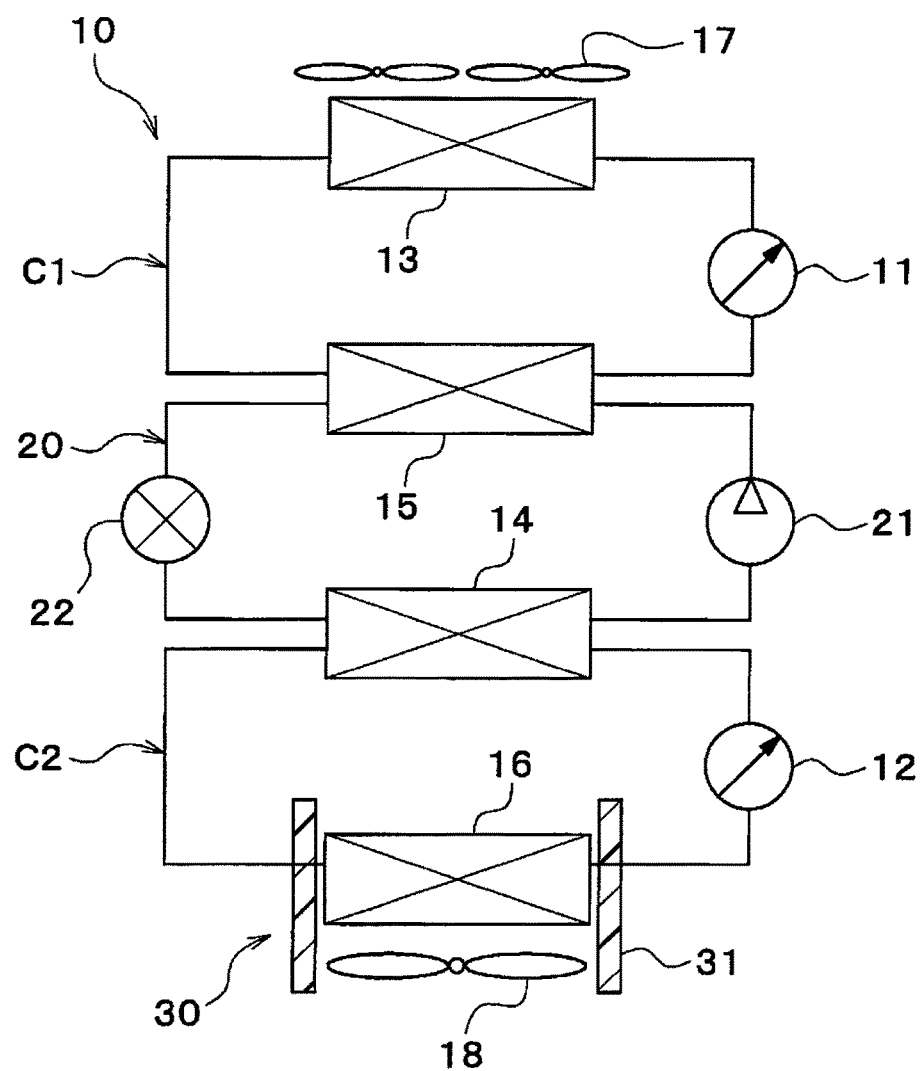
FIG. 1 is an overall configuration diagram of a refrigeration cycle device for a vehicle in a first embodiment.

A description will hereinafter be made on embodiments on the basis of the drawings. It should be noted that, in each of the following embodiments, components that are mutually the same or equivalent are denoted by the same reference signs in the drawings.

First Embodiment

A refrigeration cycle device 10 for a vehicle shown in FIG. 1 constitutes a vehicular air conditioner for conditioning a vehicle cabin at an appropriate temperature. In this embodiment, the refrigeration cycle device 10 for a vehicle is applied to a hybrid vehicle that obtains drive power for running a vehicle from an engine (i.e., an internal combustion engine) and an electric motor for travel.

The hybrid vehicle of this embodiment is configured as a plug-in hybrid vehicle that can store electric power supplied from an external power source (i.e., a commercial power source) during parking of the vehicle in a cell mounted in the vehicle (i.e., an in-vehicle battery). A lithium-ion cell can be used as the cell, for example.

The drive power output from the engine is used not only for a travel of the vehicle but also to actuate a generator. The electric power generated by the generator and the electric power supplied from the external power source can be stored in the cell, and the electric power stored in the cell is supplied not only to the electric motor for travel but also to various types of onboard equipment including electrically-configured equipment that constitutes the refrigeration cycle device 10 for a vehicle.

As shown in FIG. 1, the refrigeration cycle device 10 for a vehicle includes a first pump 11, a second pump 12, a radiator 13, a coolant cooler 14, a coolant heater 15, and a cooler core 16.

The first pump 11 and the second pump 12 are pumps that draw and discharge a coolant, and are each constructed by an electric pump, for example. The coolant is a fluid as a heating medium. In this embodiment, a liquid that at least contains ethylene glycol, dimethyl polysiloxane, or a nano fluid, or an antifreeze liquid is used as the coolant.

The radiator 13, the coolant cooler 14, the coolant heater 15, and the cooler core 16 are coolant distribution equipment (heating medium distribution equipment) to which the coolant is distributed.

The radiator 13 is a coolant/outside air heat exchanger (i.e., a heating medium-outside air heat exchanger) that exchanges heat between the coolant and outside air (i.e., cabin outside air). The outside air is supplied to the radiator 13 by an exterior blower 17.

The exterior blower 17 is an outside air blower (i.e., a blowing device) that blows the outside air to the radiator 13. For example, the exterior blower 17 is an electric blower in which a blower fan is driven by an electric motor (i.e., a blower motor).

The radiator 13 and the exterior blower 17 are arranged in a forefront of the vehicle. Thus, the radiator 13 can be exposed to a travel wind during a travel of the vehicle.

The radiator 13 functions as a radiating heat exchanger that radiates heat of the coolant to the outside air. When the coolant flowing through the radiator 13 is at a lower temperature than the outside air, the radiator 13 functions as an absorbing heat exchanger that causes the coolant to absorb heat of the outside air.

The coolant cooler 14 is a low-pressure side heat exchanger (i.e., a heating medium cooler) that cools the coolant by exchanging heat between a low-pressure side refrigerant of a refrigerant circuit 20 (i.e., a refrigeration cycle) and the coolant. The coolant cooler 14 can cool the coolant at a lower temperature than an outside air temperature.

The coolant heater 15 is a high-pressure side heat exchanger (i.e., a heating medium heater) that heats the coolant by exchanging heat between a high-pressure side refrigerant of the refrigerant circuit 20 and the coolant. The coolant heater 15 can heat the coolant at a higher temperature than the outside air temperature.

The refrigerant circuit 20 is a vapor-compression-type refrigerator that includes a compressor 21, the coolant heater 15, an expansion valve 22, and the coolant cooler 14. In the refrigerant circuit 20 of this embodiment, a chlorofluorocarbon-based refrigerant is used as the refrigerant, and a subcritical refrigeration cycle in which pressure of the high-pressure side refrigerant does not exceed critical pressure of the refrigerant is configured.

The compressor 21 is an electric compressor that is driven by the electric power supplied from the cell or a variable displacement compressor that is driven by a belt, and draws, compresses, and discharges the refrigerant in the refrigerant circuit 20.

The coolant heater 15 is a condenser that condenses the high-pressure side refrigerant by exchanging heat between the high-pressure side refrigerant discharged from the compressor 21 and the coolant. The expansion valve 22 is a pressure reducer that reduces pressure of and expands the liquid-phase refrigerant that has flowed from the coolant heater 15.

The coolant cooler 14 is an evaporator that evaporates a low-pressure refrigerant, which is after being decompressed and expanded in the expansion valve 22, by exchanging heat between the coolant and the low-pressure refrigerant. A gas-phase refrigerant that has evaporated in the coolant cooler 14 is drawn into and compressed by the compressor 21.

The cooler core 16 is a coolant/air heat exchanger that cools the air to be blown into the vehicle cabin by exchanging heat between the coolant and the air to be blown into the vehicle cabin. In other word, the cooler core 16 is an air-cooling heat exchanger that cools the air by using at least some of quantity of heat of the refrigerant discharged from the compressor 21.

The coolant cooler 14 and the cooler core 16 are an air cooler that cools the air to be blown into the vehicle cabin by using cold heat of the low-pressure refrigerant, the pressure of which has been reduced by the expansion valve 22.

Inside air (i.e., the air in the vehicle cabin), the outside air, or mixed air of the inside air and the outside air is supplied to the cooler core 16 by an interior blower 18.

The interior blower 18 is a blower (i.e., a blowing device) that generates the air flowing toward the vehicle cabin. For example, the interior blower 18 is an electric blower in which a centrifugal multi-blade fan (i.e., a sirocco fan) is driven by an electric motor (i.e., a blower motor). The interior blower 18 is an air flow rate adjustment section that adjusts a flow rate of the air passing through the cooler core 16.

The cooler core 16 and the interior blower 18 are accommodated in a casing 31 of an interior air-conditioning unit 30. The interior air-conditioning unit 30 is arranged on an inside of a dashboard (i.e., an instrument panel) at the forefront on the inside of the vehicle cabin. The casing 31 forms an outer shell of the interior air-conditioning unit 30.

The casing 31 forms an air passage, through which the air to be blown into the vehicle cabin flows, and is molded of a resin (e.g., polypropylene) that has a certain degree of elasticity and superior strength.

A heater core (i.e., an air heater) and an air mix door may be arranged on an airflow downstream side of the cooler core 16 in the casing 31.

The heater core is a heating heat exchanger (i.e., an air heater) that heats the air to be blown into the vehicle cabin. For example, the heater core heats the air to be blown into the vehicle cabin by using the high-pressure side refrigerant (i.e., a high-temperature refrigerant) in the refrigerant circuit 20, an engine coolant (i.e., a hot coolant), or the like as a heat source.

The air mix door is a blowing air temperature adjustment section (i.e., an air-flow-rate ratio adjustment section) that adjusts a temperature of blowing air to be blown into the vehicle cabin by adjusting a ratio between a flow rate of the air that flows through the heater core and a flow rate of the air that flows while bypassing the heater core.

The first pump 11, the radiator 13, and the coolant heater 15 are arranged in a first coolant circuit C1 (i.e., a first heating medium circuit). The first coolant circuit C1 is configured that the coolant is sequentially circulated to the first pump 11, the radiator 13, the coolant heater 15, and the first pump 11.

The second pump 12, the coolant cooler 14, and the cooler core 16 are arranged in a second coolant circuit C2 (i.e., a second heating medium circuit). The second coolant circuit C2 is configured that the coolant is sequentially circulated through the second pump 12, the coolant cooler 14, the cooler core 16, and the second pump 12.

Figure 2:
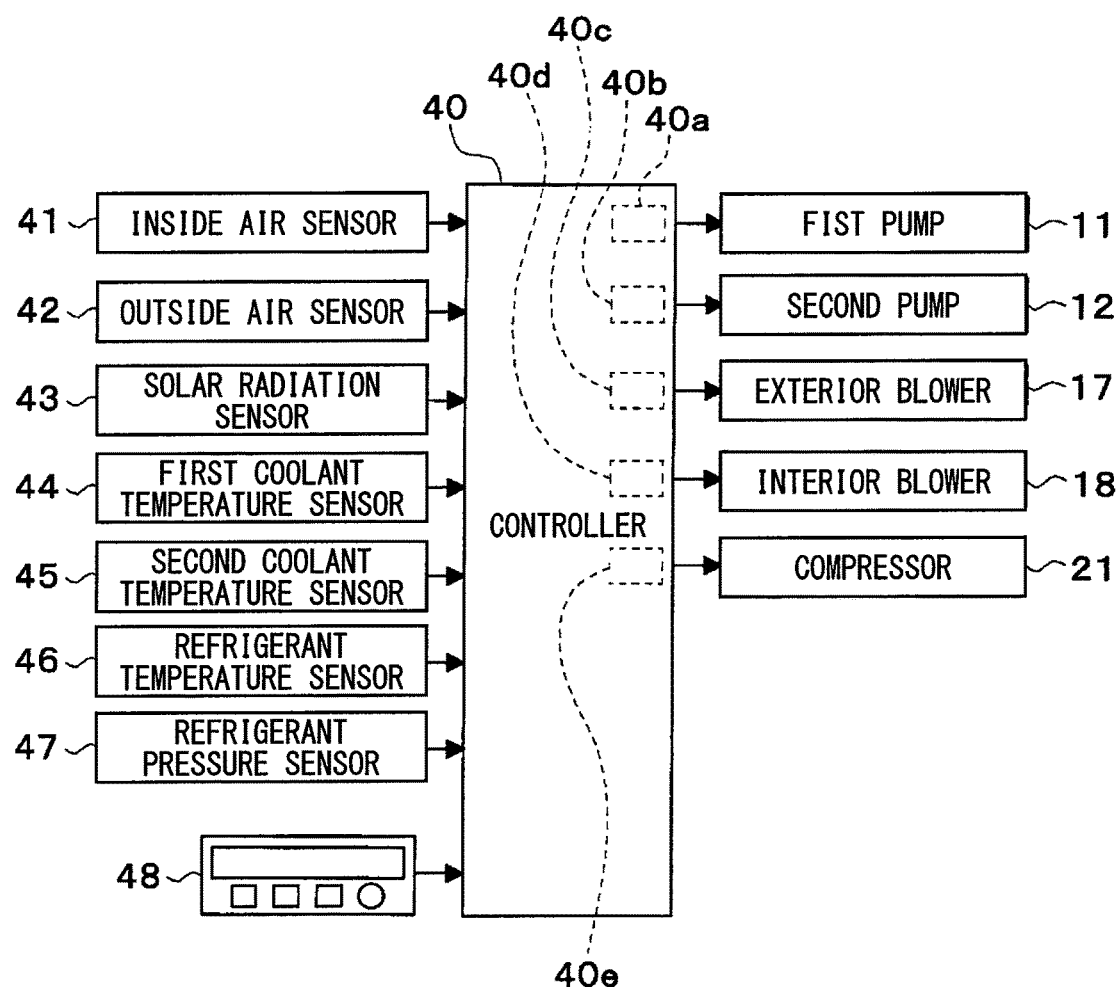
FIG. 2 is a block diagram that shows an electric control unit of the refrigeration cycle device for a vehicle in the first embodiment.

A controller 40 shown in FIG. 2 is constructed of a well-known microcomputer that includes a CPU, a ROM, a RAM, and the like and a peripheral circuit thereof. The controller 40 is a control unit that performs various types of computations and processes on the basis of an air-conditioning control program stored in the ROM thereof and that controls operation of the first pump 11, the second pump 12, the exterior blower 17, the interior blower 18, the compressor 21, and the like connected on an output side. The controller 40 is supplied with the electric power from the battery of the vehicle.

In the controller 40, the control units that control various types of control target equipment connected to the output side thereof are integrally configured. A configuration (hardware and software) controlling operation of each type of the control target equipment constitutes the control unit controlling the operation of each type of the control target equipment.

In the controller 40, a configuration (hardware and software) for controlling the operation of the first pump 11 constitutes a first coolant flow rate control unit 40a (i.e., a first heating medium flow rate control unit).

In the controller 40, a configuration (hardware and software) for controlling the operation of the second pump 12 constitutes a second coolant flow rate control unit 40b (i.e., a second heating medium flow rate control unit).

In the controller 40, a configuration (hardware and software) for controlling the operation of the exterior blower 17 constitutes an exterior blower control unit 40c.

In the controller 40, a configuration (hardware and software) for controlling the operation of the interior blower 18 constitutes an interior blower control unit 40d.

In the controller 40, a configuration (hardware and software) for controlling the operation of the compressor 21 constitutes a refrigerant flow rate control unit 40e.

The first coolant flow rate control unit 40a, the second coolant flow rate control unit 40b, the exterior blower control unit 40c, the interior blower control unit 40d, and the refrigerant flow rate control unit 40e may be configured as separate components from the controller 40.

Detection signals of sensor groups, such as an inside air sensor 41, an outside air sensor 42, a solar radiation sensor 43, a first coolant temperature sensor 44, a second coolant temperature sensor 45, a refrigerant temperature sensor 46, and a refrigerant pressure sensor 47, are input to an input side of the controller 40.

The inside air sensor 41 is a detector (i.e., an inside air temperature detector) that detects an inside air temperature (i.e., a vehicle cabin inside temperature). The outside air sensor 42 is a detector (i.e., an outside air temperature detector) that detects an outside air temperature (i.e., a vehicle cabin outside temperature). The solar radiation sensor 43 is a detector (i.e., a solar radiation amount detector) that detects a solar radiation amount in the vehicle cabin.

The first coolant temperature sensor 44 is a detector (i.e., a first heating medium temperature detector) that detects a temperature of the coolant flowing through the first coolant circuit C1 (e.g., a temperature of the coolant that has flowed from the coolant heater 15).

The second coolant temperature sensor 45 is a detector (i.e., a second heating medium temperature detector) that detects the temperature of the coolant flowing through the second coolant circuit C2 (e.g., the temperature of the coolant that has flowed from the coolant cooler 14).

The refrigerant temperature sensor 46 is a detector (i.e., a refrigerant temperature detector) that detects temperatures of the refrigerant in the refrigerant circuit 20. The temperatures of the refrigerant in the refrigerant circuit 20 that are detected by the refrigerant temperature sensor 46 are, for example, a temperature of a high-pressure refrigerant that is discharged from the compressor 21, a temperature of the low-pressure refrigerant that is drawn into the compressor 21, a temperature of the low-pressure refrigerant, the pressure of which is reduced and expanded by the expansion valve 22, a temperature of the low-pressure refrigerant that is subjected to heat exchange in the coolant cooler 14, and the like.

The refrigerant pressure sensor 47 is a detector (i.e., a refrigerant pressure detector) that detects pressure of the refrigerant in the refrigerant circuit 20 (e.g., pressure of the high-pressure refrigerant that is discharged from the compressor 21 and pressure of the low-pressure refrigerant that is drawn into the compressor 21).

The inside air temperature, the outside air temperature, the coolant temperature, the refrigerant temperature, and the refrigerant pressure may be estimated on the basis of detection values of various types of physical quantities.

For example, the coolant temperature in the first coolant circuit C1 may be calculated on the basis of at least one of exit refrigerant pressure of the coolant heater 15, discharging refrigerant pressure of the compressor 21, pressure of the high-pressure side refrigerant in the refrigerant circuit 20, a temperature of the high-pressure side refrigerant in the refrigerant circuit 20, a temperature of a heat exchange fin of the radiator 13, a temperature of a heat exchange fin of the coolant heater 15, and the like.

For example, the coolant temperature in the second coolant circuit C2 may be calculated on the basis of at least one of exit refrigerant pressure of the coolant cooler 14, suction refrigerant pressure of the compressor 21, pressure of the low-pressure side refrigerant in the refrigerant circuit 20, a temperature of the low-pressure side refrigerant in the refrigerant circuit 20, a temperature of a heat exchange fin of the cooler core 16, a temperature of a heat exchange fin of the coolant cooler 14, and the like.

An operation signal from an operation panel 48 is input to the input side of the controller 40. The operation panel 48 is arranged near the dashboard in the vehicle cabin, and the operation panel 48 is provided with various operation switches. The various operation switches provided in the operation panel 48 are, for example, an air-conditioner operation switch, a vehicle cabin inside temperature setting switch, and the like.

The air-conditioner operation switch is a switch by which an occupant requests air conditioning on the inside of the vehicle cabin and which outputs an air conditioning request signal (i.e., a compressor activation request signal) to the controller 40. The vehicle cabin inside temperature setting switch is a switch for setting the vehicle cabin inside temperature desired by the occupant.

Figure 3:
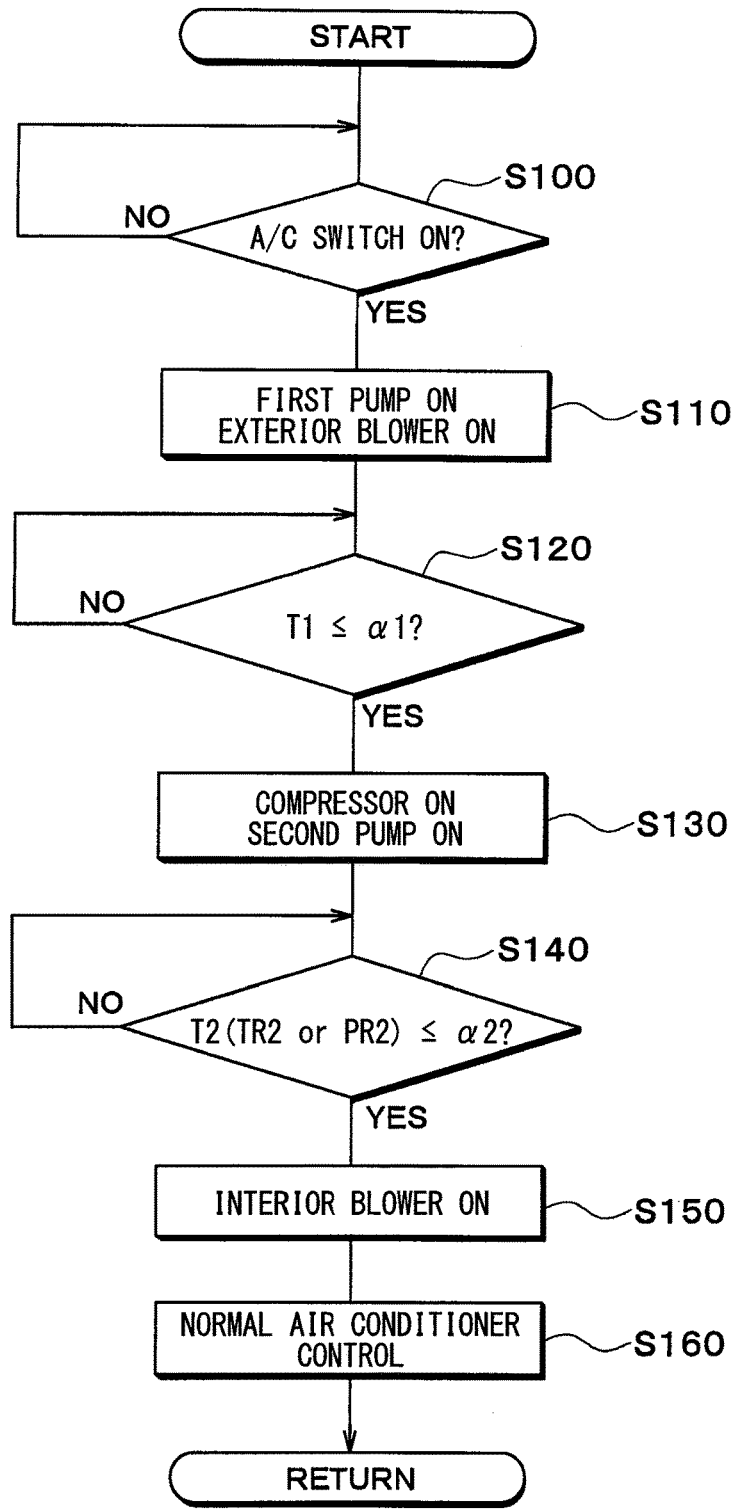
FIG. 3 is a flowchart that illustrates a control process executed by a controller of the refrigeration cycle device for a vehicle in the first embodiment.

Next, the operation in the above configuration will be described. FIG. 3 is a flowchart that illustrates overview of a control process executed by the controller 40. The controller 40 starts execution of this control process when an ignition switch of the vehicle is turned on.

It is determined in S100 whether the air-conditioner operation switch (i.e., A/C switch) provided in the operation panel 48 is on. In other words, it is determined whether an activation request of the compressor 21 has been made.

When it is determined that the A/C switch is not on, the process in S100 is repeated. When it is determined that the A/C switch is on, the process proceeds to S110, and the first pump 11 and the exterior blower 17 are activated. In this way, the coolant in the first coolant circuit C1 is cooled by the radiator 13.

It is determined in following S120 whether a coolant temperature T1 in the first coolant circuit C1 (i.e., a first circuit) is lower than or equal to a first predetermined value $\alpha 1$. When it is determined that the coolant temperature T1 in the first coolant circuit C1 is not lower than or equal to the first predetermined value $\alpha 1$, the process in S120 is repeated.

When it is determined that the coolant temperature T1 in the first coolant circuit C1 is lower than or equal to the first predetermined value $\alpha 1$, the process proceeds to S130, and the compressor 21 and the second pump 12 are activated. In this way, the coolant in the second coolant circuit C2 is cooled by the coolant cooler 14.

At this time, the coolant in the first coolant circuit C1 cooled to have the temperature that is lower than or equal to the first predetermined value $\alpha 1$ exchanges heat with the refrigerant in the coolant heater 15. Accordingly, an excess increase of the temperature and the pressure of the refrigerant can be restricted.

It may be determined in S120 whether the temperature of the high-pressure side refrigerant (i.e., the high-pressure refrigerant) in the refrigerant circuit 20 is lower than or equal to a predetermined value. In this way, it may be estimated whether the coolant temperature T1 in the first coolant circuit C1 is lower than or equal to the first predetermined value $\alpha 1$.

It is determined in following S140 whether a coolant temperature T2 in the second coolant circuit C2 (i.e., a second circuit) is lower than or equal to a second predetermined temperature $\alpha 2$. In other words, it is estimated whether the temperature or the pressure of the low-pressure side refrigerant (i.e., the low-pressure refrigerant) in the refrigerant circuit 20 is lower than or equal to a predetermined value.

When it is determined that the coolant temperature T2 in the second coolant circuit C2 is not lower than or equal to the second predetermined temperature $\alpha 2$, the process in S140 is repeated.

When it is determined that the coolant temperature T2 in the second coolant circuit C2 is lower than or equal to the second predetermined temperature $\alpha 2$, the process proceeds to S150, and the interior blower 18 is activated. In this way, the air that is blown into the vehicle cabin by the cooler core 16 is cooled.

The process in S140 may be repeated when it is determined in S140 whether the temperature of the low-pressure side refrigerant (i.e., the low-pressure refrigerant) in the refrigerant circuit 20 is lower than or equal to the second predetermined temperature $\alpha 2$, and when it is determined that the temperature T2 of the low-pressure side refrigerant in the refrigerant circuit 20 is not lower than or equal to the second predetermined temperature $\alpha 2$. When it is determined that the temperature T2 of the low-pressure side refrigerant is lower than or equal to the second predetermined temperature $\alpha 2$, the process may proceeds to S150.

In following S160, normal air conditioner control is executed. In other words, a refrigerant discharge ability of the compressor 21, an air blowing capacity of the interior blower 18, and the like are controlled such that the vehicle cabin inside temperature becomes a temperature set by the vehicle cabin inside temperature setting switch on the operation panel 48.

For example, the refrigerant discharge ability of the compressor 21, the air blowing capacity of the interior blower 18, and the like may be controlled on the basis of a target blowing temperature TAO or the like. The target blowing temperature TAO is calculated by the following equation.

$$TAO = Kset \times Tset - Kr \times Tr - Kam \times Tam \times Ks \times Ts + C$$

Tset is a vehicle cabin inside setting temperature that is set by the vehicle cabin inside temperature setting switch, Tr is the vehicle cabin inside temperature (i.e., the inside air temperature) that is detected by the inside air sensor 41, Tam is the outside air temperature that is detected by the outside air sensor 42, and Ts is the solar radiation amount that is detected by the solar radiation sensor 43. Kset, Kr, Kam, Ks are control gains, and C is a constant for correction.

In this embodiment, when the activation request of the compressor 21 is made, the controller 40 activates the first pump 11. The controller 40 activates the compressor 21, after activating the first pump 11, when it is determined that the coolant temperature T1 of the first coolant circuit C1 is lower than or equal to the first predetermined value α1.

According to the above features, the first pump 11 is activated when the activation request of the compressor 21 is made. Thus, the coolant in the first coolant circuit C1 can be cooled by heat exchange between the coolant in the first coolant circuit C1 and the outside air in the radiator 13.

When it is determined or estimated that the coolant temperature T1 in the first coolant circuit C1 is lower than or equal to the first predetermined value α1, the compressor 21 is activated. Accordingly, in the coolant heater 15, heat is exchanged between the coolant in the first coolant circuit C1, which has been cooled to some extent by the radiator 13, and the refrigerant. Thus, the excess increase of the temperature and the pressure of the refrigerant upon activation of the compressor 21 can be restricted.

In this embodiment, when activating the first pump 11, the controller 40 also activates the exterior blower 17. Thus, the coolant in the first coolant circuit 17 can be cooled at an early stage.

In this embodiment, the interior blower 18 is activated, after the controller 40 activates the compressor 21, when it is determined or estimated that the coolant temperature T2 in the second coolant circuit C2 (i.e., a temperature TR2 or pressure PR2 of the low-pressure refrigerant) is lower than or equal to the second predetermined temperature α2 interior blower.

According to the above features, the interior blower 18 is activated after the low-pressure refrigerant becomes at a low temperature to some extent. Accordingly, when the interior blower 18 is activated, the coolant in the second coolant circuit C2, which has been cooled to some extent by the coolant cooler 14, cools the air to be blown into the vehicle cabin by the cooler core 16 to some extent. Thus, the occupant can be prevented from feeling uncomfortable due to nearly-uncooled warm air that is blown into the vehicle cabin.

In this embodiment, heat is exchanged between the low-pressure refrigerant, the pressure of which is reduced by the expansion valve 22, and the coolant in the second coolant circuit C2, so as to cool the coolant in the second coolant circuit C2. The cooler core 16 exchanges heat between the coolant in the second coolant circuit C2, which has been cooled by the coolant cooler 14, and the air to be blown into the vehicle cabin, so as to cool the air to be blown into the vehicle cabin.

According to the above features, due to large heat capacity of the coolant in the second coolant circuit C2, an abrupt change of an air cooling temperature in the cooler core 16 can be restricted. Thus, adhesion of frost on the cooler core 16 that is caused by the abrupt drop of the air cooling temperature in the cooler core 16 can be suppressed. In addition, execution of frost adhesion restricting control for stopping the compressor 21 in order to suppress the adhesion of the frost on the cooler core 16 can be restricted.

Second Embodiment

In the above embodiment, in the case where the A/C switch is turned on, the first pump 11 is activated, and the coolant in the first coolant circuit C1 is cooled. On the other hand, in this embodiment, even in the case where the A/C switch is not on and where the coolant temperature in the first coolant circuit C1 is increased, the first pump 11 is activated, and the coolant in the first coolant circuit C1 is cooled.

Figure 4:
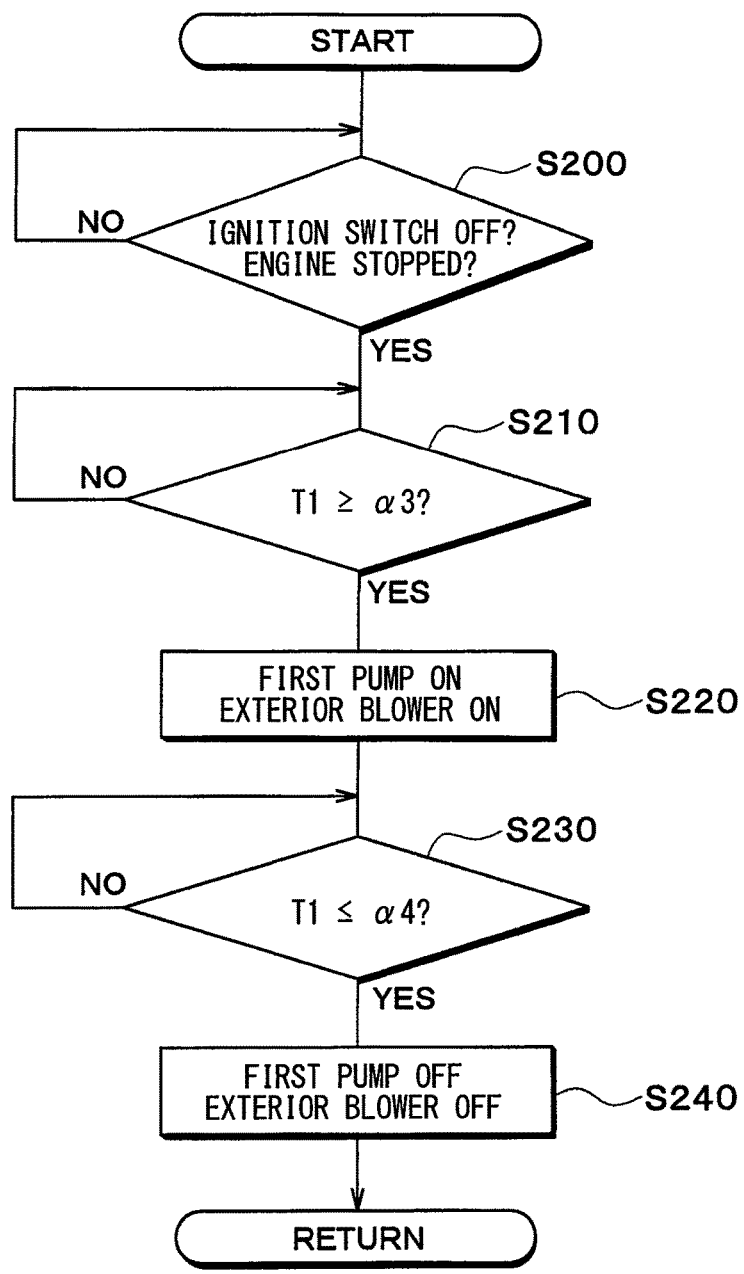
FIG. 4 is a flowchart that illustrates a control process executed by a controller of a refrigeration cycle device for a vehicle in a second embodiment.
Figure 5:
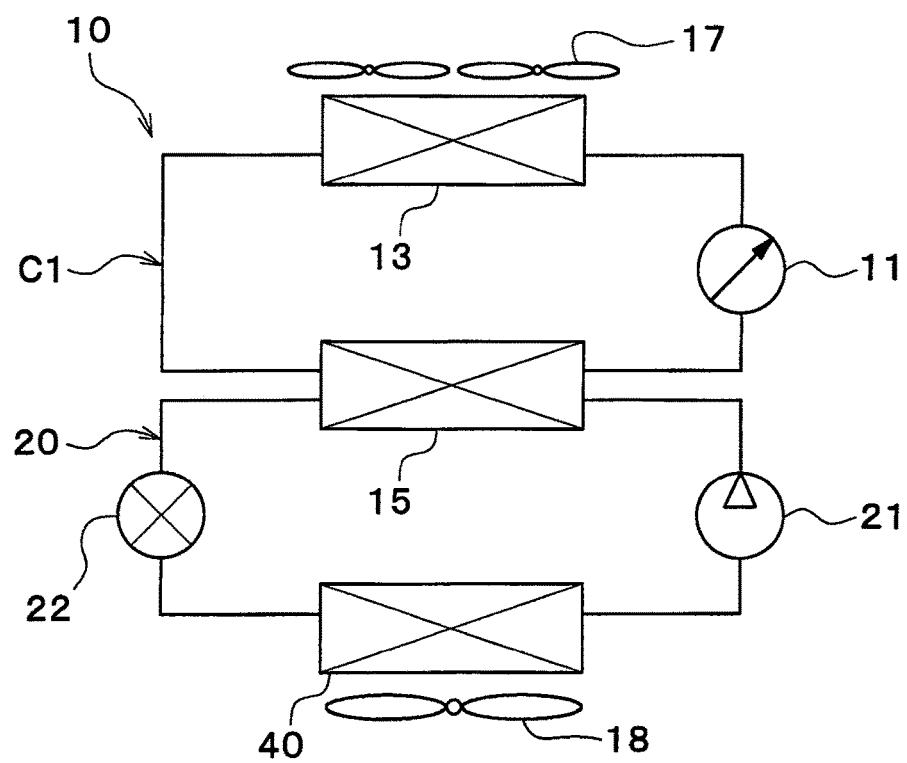
FIG. 5 is an overall configuration diagram of a refrigeration cycle device for a vehicle in a third embodiment.

FIG. 4 is a flowchart that illustrates overview of a control process executed by the controller 40. In this embodiment, the electric power is supplied to the controller 40 from the battery of the vehicle regardless of an on/off state of the ignition switch of the vehicle. The controller 40 starts executing this control process regardless of the on/off state of the ignition switch of the vehicle.

It is determined in S200 whether the vehicle is in at least one state of a state that the ignition switch of the vehicle is off and a state that the engine of the vehicle is stopped. That is, it is determined whether the vehicle is parked.

When it is determined that the vehicle is in at least one state of the state that the ignition switch of the vehicle is off and the state that the engine of the vehicle is stopped (i.e., when it is determined that the vehicle is parked), the process proceeds to S210. It is determined in S210 whether the coolant temperature T1 in the first coolant circuit C1 (i.e., the first circuit) is higher than or equal to a third predetermined temperature α3.

When it is determined that the coolant temperature T1 in the first coolant circuit C1 is not higher than or equal to the third predetermined temperature α3, the process in S210 is repeated. When it is determined that the coolant temperature T1 in the first coolant circuit C1 is higher than or equal to the third predetermined temperature α3, the process proceeds to S220, and the first pump 11 and the exterior blower 17 are activated. In this way, the coolant in the first coolant circuit C1 is cooled by the radiator 13.

It may be determined in S210 whether the temperature or the pressure of the high-pressure side refrigerant (i.e., the high-pressure refrigerant) in the refrigerant circuit 20 is higher than or equal to a predetermined value. In this way, it may be estimated whether the coolant temperature T1 in the first coolant circuit C1 is lower than or equal to the third predetermined temperature α3.

Instead of the coolant temperature T1 in the first coolant circuit C1, it may be estimated in S210 whether the coolant temperature T2 in the second coolant circuit C2 may be higher than or equal to the third predetermined temperature α3. It is because, in the case where the vehicle is parked, the temperature of the coolant in the second coolant circuit C2 is increased in the similar manner as the temperature of the coolant in the first coolant circuit C1.

It is determined in S230 whether the coolant temperature T1 in the first coolant circuit C1 (i.e., the first circuit) is lower than or equal to a fourth predetermined value α4. The fourth predetermined value α4 is a smaller value than the third predetermined temperature α3.

When it is determined that the coolant temperature T1 in the first coolant circuit C1 is not lower than or equal to the fourth predetermined value α4, the process in S230 is repeated. When it is determined that the coolant temperature T1 or the pressure in the first coolant circuit C1 is lower than or equal to the fourth predetermined value α4, the process proceeds to S240, and the first pump 11 and the exterior blower 17 are stopped.

It may be determined in S230 whether the temperature or the pressure of the high-pressure side refrigerant (i.e., the high-pressure refrigerant) in the refrigerant circuit 20 is lower than or equal to a predetermined value. In this way, it may be estimated whether the coolant temperature T1 in the first coolant circuit C1 is lower than or equal to the fourth predetermined value α4.

Instead of the coolant temperature T1 in the first coolant circuit C1, it may be estimated in S230 whether the coolant temperature T2 in the second coolant circuit C2 is lower than or equal to the fourth predetermined value α4.

In this embodiment, in the case where the vehicle is in at least one state of the state that the ignition switch of the vehicle is off and the state that the engine of the vehicle is stopped and where it is determined or estimated that the coolant temperature T1 in the first coolant circuit C1 is higher than or equal to the third predetermined temperature α3, the controller 40 activates the first pump 11. After the controller 40 activates the first pump 11, and in the case where it is determined or estimated that the coolant temperature T1 in the first coolant circuit C1 is lower than or equal to the fourth predetermined value α4 that is smaller than the third predetermined temperature α3, the controller 40 stops the first pump 11.

According to what has been described above, an excess increase of the coolant temperature T1 in the first coolant circuit C1 in the state that the ignition switch of the vehicle is off or the state that the engine of the vehicle is stopped in a high-temperature environment can be restricted. Thus, after the ignition switch of the vehicle is turned on, or after the engine of the vehicle is actuated, the compressor 21 can be activated promptly to start the air conditioning.

In the case where the vehicle is in at least one state of the state that the ignition switch of the vehicle is off and the state that the engine of the vehicle is stopped and where it is determined or estimated that one physical quantity of the coolant temperature T1 in the first coolant circuit C1, the refrigerant temperature, and the refrigerant pressure is higher than or equal to the third predetermined temperature α3, the controller 40 activates the first pump 11. Next, the controller 40 stops the compressor 21, after activating the first pump 11, when it is determined or estimated that the one physical quantity of the coolant temperature T1 in the first coolant circuit C1, the refrigerant temperature, and the refrigerant pressure is lower than or equal to the fourth predetermined value α4 that is smaller than the third predetermined temperature α3. Also, in this case, the same operational effect as that in this embodiment can be obtained.

Third Embodiment

In the above first embodiment, the second coolant circuit C2 is provided. However, in this third embodiment, the second coolant circuit C2 is not provided, and an evaporator 40 is provided instead of the coolant cooler 14.

The evaporator 40 is a coolant/air heat exchanger that exchanges heat between the low-pressure refrigerant, the pressure of which has been reduced and expanded by the expansion valve 22, and the air to be blown into the vehicle cabin, so as to cool the air to be blown into the vehicle cabin. The evaporator 40 is an air cooler that cools the air to be blown into the vehicle cabin by using the cold heat of the low-pressure refrigerant, the pressure of which has been reduced by the expansion valve 22. The inside air (i.e., the air in the vehicle cabin), the outside air, or the mixed air of the inside air and the outside air is supplied to the evaporator 40 by the interior blower 18.

In this embodiment, it is determined in S140 shown in FIG. 3 whether the temperature TR2 or the pressure PR2 of the low-pressure refrigerant in the refrigerant circuit 20 is lower than the second predetermined temperature α2. When it is determined that the temperature TR2 or the pressure PR2 of the low-pressure refrigerant in the refrigerant circuit 20 is not lower than the second predetermined temperature α2, the process in S140 is repeated. When it is determined that the temperature TR2 or the pressure PR2 of the low-pressure refrigerant in the refrigerant circuit 20 is lower than the second predetermined temperature α2, the process proceeds to S150, and the interior blower 18 is activated.

Also, in this embodiment, the same operational effect as that in the first embodiment can be obtained.

Fourth Embodiment

In the second embodiment, in the case where the coolant temperature in the first coolant circuit C1 is increased in the state that the vehicle is parked and the A/C switch is off, the first pump 11 is activated, and the coolant in the first coolant circuit C1 is cooled. On the other hand, in this embodiment, in the case where the coolant temperature in the first coolant circuit C1 is increased in a state that the vehicle is running and the A/C switch is off, the first pump 11 is activated, and the coolant in the first coolant circuit C1 is cooled.

Figure 6:
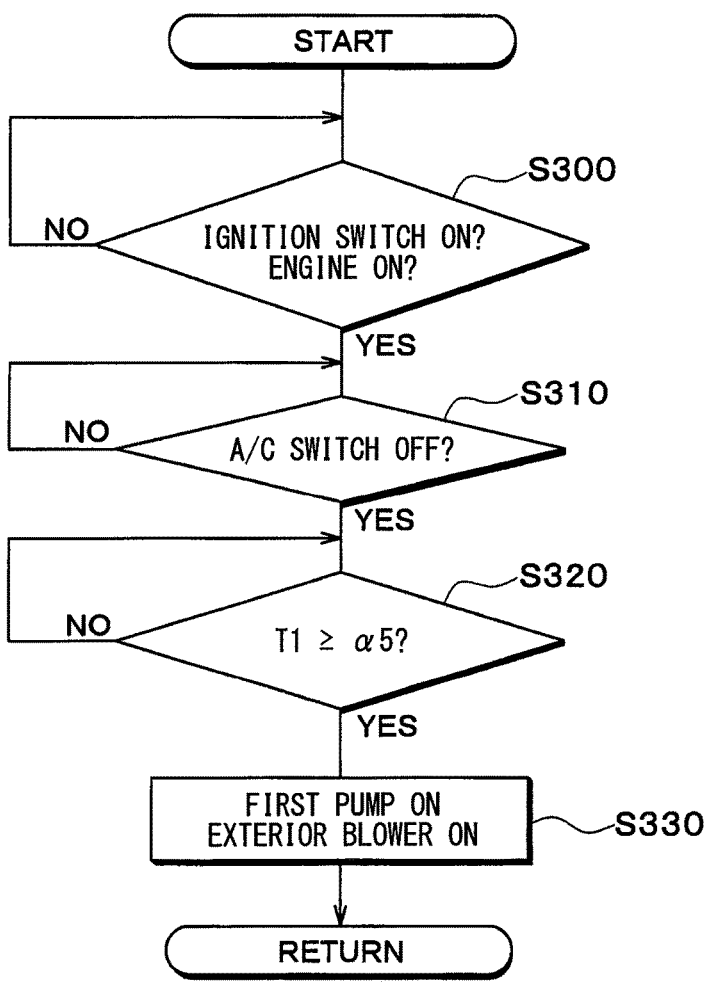
FIG. 6 is a flowchart that illustrates a control process executed by a controller of a refrigeration cycle device for a vehicle in a fourth embodiment.

FIG. 6 is a flowchart that illustrates overview of a control process executed by the controller 40. It is determined in S300 whether the vehicle is in a state that the ignition switch of the vehicle is on and the engine of the vehicle is on. That is, it is determined whether the vehicle is running.

When it is determined that the vehicle is in the state that the ignition switch of the vehicle is on and the engine of the vehicle is on (i.e., when it is determined that the vehicle is running), the process proceeds to S310. Then, it is determined whether the A/C switch provided on the operation panel 48 is in an off state. In other words, it is determined whether the activation request of the compressor 21 is made.

When it is determined that the A/C switch is not in the off state, the process in S310 is repeated. When it is determined that the A/C switch is in the off state, the process proceeds to S320. Then, it is determined whether the coolant temperature T1 in the first coolant circuit C1 (i.e., the first circuit) is higher than or equal to a fifth predetermined value α5.

When it is determined that the coolant temperature T1 in the first coolant circuit C1 is not higher than or equal to the fifth predetermined value α5, the process in S320 is repeated. When it is determined that the coolant temperature T1 in the first coolant circuit C1 is higher than or equal to the fifth predetermined value α5, the process proceeds to S330, and the first pump 11 and the exterior blower 17 are activated. In this way, the coolant in the first coolant circuit C1 is cooled by the radiator 13.

It may be determined in S320 whether the temperature or the pressure of the high-pressure side refrigerant (i.e., the high-pressure refrigerant) in the refrigerant circuit 20 is higher than or equal to a predetermined value. In this way, it may be estimated whether the coolant temperature T1 in the first coolant circuit C1 is higher than or equal to the fifth predetermined value α5.

Instead of the coolant temperature T1 in the first coolant circuit C1, it may be estimated in S320 whether the coolant temperature T2 in the second coolant circuit C2 may be higher than or equal to the fifth predetermined value α5. It is because, in the case where the A/C switch is in the off state, the temperature of the coolant in the second coolant circuit C2 is increased in the similar manner as the temperature of the coolant in the first coolant circuit C1.

In this embodiment, when it is determined or estimated that the coolant temperature T1 in the first coolant circuit C1 is higher than or equal to the fifth predetermined value α5 in a state that the ignition switch of the vehicle is on, that the engine of the vehicle is actuated, and that the compressor 21 is stopped, the first pump 11 is activated.

According to the above features, the excess increase of the coolant temperature T1 in the first coolant circuit C1 in the state that the vehicle is running and the compressor 21 is stopped can be restricted. Thus, when the activation request of the compressor 21 is made, the compressor 21 can be activated promptly to start the air conditioning.

Fifth Embodiment

In the above embodiments, the refrigeration cycle device 10 for a vehicle constitutes the vehicular air conditioner. However, the refrigeration cycle device 10 for a vehicle may constitute a vehicular heat management system for adjusting various types of equipment included in the vehicle at an appropriate temperature.

For example, various types of temperature adjustment target equipment (i.e., cooling target equipment, heating target equipment), a temperature of each of which is adjusted (cooled, heated) by the coolant, may be arranged in the first coolant circuit C1 and the second coolant circuit C2.

Furthermore, the first coolant circuit C1 and the second coolant circuit C2 may be connected via a switching valve. In this case, the switching valve switches between a case where the coolant drawn into and discharged by the first pump 11 circulates through each of a plurality of the heating medium distribution equipment arranged in the first coolant circuit C1 and the second coolant circuit C2 and a case where the coolant drawn into and discharged by the second pump circulates therethrough.

Figure 7:
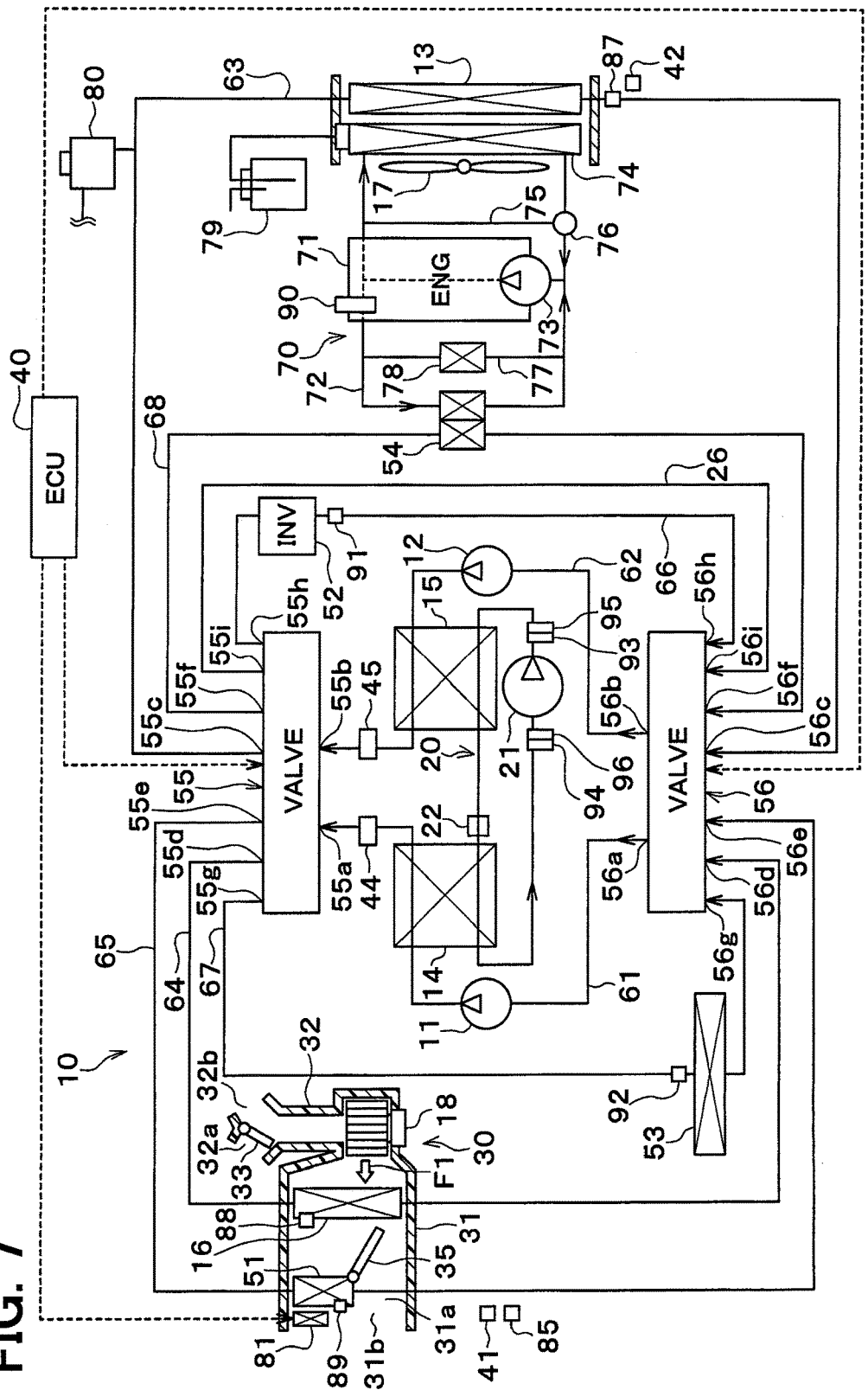
FIG. 7 is an overall configuration diagram of a refrigeration cycle device for a vehicle in a fifth embodiment.

More specifically, as shown in FIG. 7, a heat management system 10 of this embodiment includes a heater core 51, an inverter 52, a battery temperature adjustment heat exchanger 53, a coolant-coolant heat exchanger 54, a first switching valve 55, and a second switching valve 56.

The heater core 51 is coolant distribution equipment (i.e., heating medium distribution equipment) to which the coolant is distributed. For example, the heater core 51 is an air-heating heat exchanger (i.e., a heating medium/air heat exchanger) that heats the air to be blown into the vehicle cabin by exchanging heat between the coolant and the air to be blown into the vehicle cabin.

In the cooler core 16, the coolant absorbs heat from the air through a sensible heat change. In other words, in the cooler core 16, even when the coolant absorbs heat from the air, the coolant remains in the liquid phase, and a phase change does not occur. The inside air, the outside air, or the mixed air of the inside air and the outside air is supplied to the cooler core 16 by the interior blower 18.

The inverter 52, the battery temperature adjustment heat exchanger 53, and the coolant-coolant heat exchanger 54 are heat transfer equipment (i.e., the temperature adjustment target equipment) that has a path through which the coolant is distributed and that transfers heat to/from the coolant.

The inverter 52 is an electric power converter that converts DC power supplied from the battery to AC voltage and outputs the AC voltage to the electric motor for travel. The inverter 52 is heat generation equipment that generates heat in conjunction with activation.

The battery temperature adjustment heat exchanger 53 is a heat exchanger that exchanges heat between the battery and the coolant. The battery temperature adjustment heat exchanger 53 is a heat exchanger that is arranged in contact with the battery and performs thermal conduction with the battery. The battery temperature adjustment heat exchanger 53 may be a heat exchanger (i.e., an air/heating medium heat exchanger) that is arranged in an air delivery passage to the battery and exchanges heat between the air and the coolant.

The coolant-coolant heat exchanger 54 is a heat exchanger (i.e, a heating medium/heating medium heat exchanger) that exchanges heat between the coolant in the vehicular heat management system 10 (i.e., the coolant circulated by the first pump 11 or the second pump 12) and the coolant in an engine cooling circuit 70 (i.e., a heating medium for the engine).

The first pump 11 is arranged in a first pump path 61. A coolant cooling heat exchanger 14 is arranged on a discharge side of the first pump 11 in the first pump path 61.

The second pump 12 is arranged in a second pump path 62. A coolant heating heat exchanger 15 is arranged on a discharge side of the second pump 12 in the second pump path 62.

An exterior heat exchanger 13 is arranged in an exterior heat exchanger path 63. The cooler core 16 is arranged in a cooler core path 64. The heater core 51 is arranged in a heater core path 65.

The inverter 52 is arranged in an inverter path 66. The battery temperature adjustment heat exchanger 53 is arranged in a battery temperature adjustment path 67. The coolant-coolant heat exchanger 54 is arranged in a coolant-coolant heat exchanger path 68.

The first pump path 61, the second pump path 62, the exterior heat exchanger path 63, the cooler core path 64, the heater core path 65, the inverter path 66, the battery temperature adjustment path 67, and the coolant-coolant heat exchanger path 68 are connected to the first switching valve 55 and the second switching valve 56. The first switching valve 55 and the second switching valve 56 are switching sections switching a flow of the coolant.

The first switching valve 55 has a first inlet 55*a* and a second inlet 55*b* as inlets of the coolant. The first switching valve 55 further has a first outlet 55*c*, a second outlet 55*d*, a third outlet 55*e*, a fourth outlet 55*f*, a fifth outlet 55*g*, a sixth outlet 55*h*, and a seventh outlet 55*i* as outlets of the coolant.

The second switching valve 56 has a first outlet 56*a* and a second outlet 56*b* as outlets of the coolant. The second switching valve 56 further has a first inlet 56*c*, a second inlet 56*d*, a third inlet 56*e*, a fourth inlet 56*f*, a fifth inlet 56*g*, a sixth inlet 56*h*, and a seventh inlet 56*i* as inlets of the coolant.

One end of the first pump path 61 is connected to the first inlet 55*a* of the first switching valve 55. In other words, a coolant outlet side of the coolant cooling heat exchanger 14 is connected to the first inlet 55*a* of the first switching valve 55.

One end of the second pump path 62 is connected to the second inlet 55*b* of the first switching valve 55. In other words, a coolant outlet side of the coolant heating heat exchanger 15 is connected to the second inlet 55*b* of the first switching valve 55.

One end of the exterior heat exchanger path 63 is connected to the first outlet 55*c* of the first switching valve 55. In other words, a coolant inlet side of the exterior heat exchanger 13 is connected to the first outlet 55*c* of the first switching valve 55.

One end of the cooler core path 64 is connected to the second outlet 55*d* of the first switching valve 55. In other words, a coolant inlet side of the cooler core 16 is connected to the second outlet 55*d* of the first switching valve 55.

One end of the heater core path 65 is connected to the third outlet 55*e* of the first switching valve 55. In other words, a coolant inlet side of the heater core 51 is connected to the third outlet 55e of the first switching valve 55.

One end of the coolant-coolant heat exchanger path 68 is connected to the fourth outlet 55f of the first switching valve 55. In other words, a coolant inlet side of the coolant-coolant heat exchanger 54 is connected to the fourth outlet 55f of the first switching valve 55.

One end of the battery temperature adjustment path 67 is connected to the fifth outlet 55g of the first switching valve 55. In other words, a coolant inlet side of the battery temperature adjustment heat exchanger 53 is connected to the fifth outlet 55g of the first switching valve 55.

One end of the inverter path 66 is connected to the sixth outlet 55h of the first switching valve 55. In other words, a coolant inlet side of the inverter 52 is connected to the sixth outlet 55h of the first switching valve 55.

One end of a bypass passage 26 is connected to the seventh outlet 55i of the first switching valve 55. The bypass passage 26 is a path through which the coolant flows while bypassing each of the coolant distribution equipment 13, 16, 51, 52, 53, 54.

The other end of the first pump path 61 is connected to the first outlet 56a of the second switching valve 56. In other words, a coolant suction side of the first pump 11 is connected to the first outlet 56a of the second switching valve 56.

The other end of the second pump path 62 is connected to the second outlet 56b of the second switching valve 56. In other words, a coolant suction side of the second pump 12 is connected to the second outlet 56b of the second switching valve 56.

The other end of the exterior heat exchanger path 63 is connected to the first inlet 56c of the second switching valve 56. In other words, a coolant outlet side of the exterior heat exchanger 13 is connected to the first inlet 56c of the second switching valve 56.

The other end of the cooler core path 64 is connected to the second inlet 56d of the second switching valve 56. In other words, a coolant outlet side of the cooler core 16 is connected to the second inlet 56d of the second switching valve 56.

The other end of the heater core path 65 is connected to the third inlet 56e of the second switching valve 56. In other words, a coolant outlet side of the heater core 51 is connected to the third inlet 56e of the second switching valve 56.

The other end of the coolant-coolant heat exchanger path 68 is connected to the fourth inlet 56f of the second switching valve 56. In other words, a coolant outlet side of the coolant-coolant heat exchanger 54 is connected to the fourth inlet 56f of the second switching valve 56.

The other end of the battery temperature adjustment path 67 is connected to the fifth inlet 56g of the second switching valve 56. In other words, a coolant outlet side of the battery temperature adjustment heat exchanger 53 is connected to the fifth inlet 56g of the second switching valve 56.

The other end of the inverter path 66 is connected to the sixth inlet 56h of the second switching valve 56. In other words, a coolant outlet side of the inverter 52 is connected to the sixth inlet 56h of the second switching valve 56.

The other end of the bypass passage 26 is connected to the seventh inlet 56i of the second switching valve 56.

The first switching valve 55 and the second switching valve 56 each have a structure that can arbitrary or selectively switch a communication state with each of the inlets and each of the outlets.

More specifically, the first switching valve 55 switches among a state that the coolant discharged from the first pump 11 flows in, a state that the coolant discharged from the second pump 12 flows in, and a state that neither the coolant discharged from the first pump 11 nor the coolant discharged from the second pump 12 flows in for each of the exterior heat exchanger 13, the cooler core 16, the heater core 51, the inverter 52, the battery temperature adjustment heat exchanger 53, the coolant-coolant heat exchanger 54, and the bypass passage 26.

The second switching valve 56 switches among a state that the coolant flows out into the first pump 11, a state that the coolant flows out into the second pump 12, and a state that the coolant flows out into neither the first pump 11 nor the second pump 12 for each of the exterior heat exchanger 13, the cooler core 16, the heater core 51, the inverter 52, the battery temperature adjustment heat exchanger 53, the coolant-coolant heat exchanger 54, and the bypass passage 26.

A valve opening degree can be adjusted for the first switching valve 55 and the second switching valve 56. In this way, a flow rate of the coolant that flows through the exterior heat exchanger 13, the cooler core 16, the heater core 51, the inverter 52, the battery temperature adjustment heat exchanger 53, the coolant-coolant heat exchanger 54, and the bypass passage 26 can be adjusted.

Thus, the first switching valve 55 and the second switching valve 56 are flow rate adjustment valves that adjust the flow rate of the coolant flowing through each of the coolant distribution equipment 13, 16, 51, 52, 53, 54 and the bypass passage 26.

The first switching valve 55 and the second switching valve 56 can mix the coolant discharged from the first pump 11 and the coolant discharged from the second pump 12 at an arbitrary flow rate ratio and can let the coolant flow into the exterior heat exchanger 13, the cooler core 16, the heater core 51, the inverter 52, the battery temperature adjustment heat exchanger 53, the coolant-coolant heat exchanger 54, and the bypass passage 26.

The cooler core 16 and the heater core 41 are accommodated in the casing 31 of the interior air-conditioning unit 30 of the vehicular air conditioner.

An inside/outside air switching box 32 is arranged on an uppermost stream side of the airflow in the casing 31. The inside/outside air switching box 32 is an inside/outside air introducing section that switches between and introduces the inside air (i.e., the air in the vehicle cabin) and the outside air (i.e., the cabin outside air).

The inside/outside air switching box 32 is provided with an inside air intake port 32a through which the inside air is introduced into the casing 31 and an outside air intake port 32b through which the outside air is introduced thereinto. An inside/outside air switching door 33 is arranged on the inside of the inside/outside air switching box 32.

The inside/outside air switching door 33 is an air volume ratio changing section that changes an air volume ratio between the inside air and the outside air introduced into the casing 31. More specifically, the inside/outside air switching door 33 changes the air volume ratio between the air volume of the inside air and the air volume of the outside air by continuously adjusting an opening areas of the inside air intake port 32a and the outside air intake port 32b. The inside/outside air switching door 33 is driven by an electric actuator (not shown).

The interior blower 18 (i.e., the blower) is arranged on an airflow downstream side of the inside/outside air switching box 32. The interior blower 18 is the blowing device that blows the air (i.e., the inside air and the outside air) drawn via the inside/outside air switching box 32 toward the inside of the vehicle cabin.

The cooler core 16 and the heater core 51 are arranged on an airflow downstream side of the interior blower 18 in the casing 31.

A heater core bypass passage 31a is formed in a portion on an airflow downstream side of the cooler core 16 in the casing 31. The heater core bypass passage 31a is an air passage through which the air that has passed the cooler core 16 flows without passing the heater core 51.

An air mix door 35 is arranged between the cooler core 16 and the heater core 51 in the casing 31.

The air mix door 35 is an air volume ratio adjustment section that continuously changes the air volume ratio between the air flowing into the heater core 51 and the air flowing into the heater core bypass passage 31a. The air mix door 35 is a rotatable plate-shaped door, a slidable door, or the like and is driven by an electric actuator (not shown).

The temperature of the blowing air that is blown into the vehicle cabin is changed in accordance with the air volume ratio between the air that passes the heater core 51 and the air that passes the heater core bypass passage 31a. Thus, the air mix door 35 is a temperature adjustment section that adjusts the temperature of the blowing air that is blown into the vehicle cabin.

An outlet port 31b from which the air is blown into the vehicle cabin as an air conditioning target space is arranged in an airflow lowermost stream portion of the casing 31. More specifically, a defroster outlet port, a face outlet port, and a foot outlet port are provided as the outlet port 31b.

The defroster outlet port blows off air-conditioned air toward an inner surface of a front window glass of the vehicle. The face outlet port blows off the air-conditioned air toward an upper part of a body of the occupant. The foot outlet port blows off the air-conditioned air toward feet of the occupant.

A blowing mode door (not shown) is arranged on an upstream side of the airflow of the outlet port 31b. The blowing mode door is a blowing mode switching section that switches blowing modes. The blowing mode door is driven by an electric actuator (not shown).

As the blowing modes switched by the blowing mode door, for example, a face mode, a bi-level mode, a foot mode, and a foot defroster mode are available.

The face mode is a blowing mode in which the face outlet port is completely opened and the air is blown off from the face outlet port toward the upper part of the body of the occupant in the vehicle cabin. The bi-level mode is a blowing mode in which both of the face outlet port and the foot outlet port are opened and the air is blown off toward the upper part of the body and the feet of the occupant in the vehicle cabin.

The foot mode is a blowing mode in which the foot outlet port is completely opened, the defroster outlet port is opened at a small opening degree, and the air is mainly blown off from the foot outlet port. The foot defroster mode is a blowing mode in which the foot outlet port and the defroster outlet port are opened to the same degree and the air is blown off from both of the foot outlet port and the defroster outlet port.

The engine cooling circuit 70 is a coolant circulation circuit for cooling an engine 71. The engine cooling circuit 70 has a circulation path 72 through which the engine coolant (i.e., a second heating medium) circulates. The engine 71, a third pump 73, an engine radiator 74, and the coolant-coolant heat exchanger 54 are arranged in the circulation path 72.

The third pump 73 is an electric pump that draws and discharges the engine coolant. The third pump 73 may be a mechanical pump that is driven by power output from the engine 71.

The engine radiator 74 is a radiation heat exchanger (i.e., an air/heating medium heat exchanger) that radiates heat of the coolant to the outside air by exchanging heat between the engine coolant and the outside air.

A radiator bypass passage 75 is connected to the circulation path 72. The radiator bypass passage 75 is a path through which the engine coolant flows while bypassing the engine radiator 74.

A thermostat 76 is arranged in a connected section between the radiator bypass passage 75 and the circulation path 72. The thermostat 76 is a coolant temperature responsive valve constructed of a mechanical mechanism that displaces a valve body by a thermo-wax (i.e., a thermosensitive member), a volume of which is changed by a temperature, so as to open or close a coolant path.

More specifically, when an engine coolant temperature exceeds a predetermined temperature (e.g., 80° C. or higher), the thermostat 76 closes the radiator bypass passage 75. When the coolant temperature is lower than the predetermined temperature (e.g., lower than 80° C.), the thermostat 76 opens the radiator bypass passage 75.

An engine auxiliary machine path 77 is connected to the circulation path 72. The engine auxiliary machine path 77 is a path in which the engine coolant flows in parallel with the coolant-coolant heat exchanger 54. An engine auxiliary machine 78 is arranged in the engine auxiliary machine path 77. The coolant-coolant heat exchanger 54 may be arranged in the engine auxiliary machine path 77, and the coolant may flow through the coolant-coolant heat exchanger 54 and the engine auxiliary machine 78 arranged in series.

The engine auxiliary machines 78 include an oil heat exchanger, an EGR cooler, a throttle cooler (warmer), a turbo cooler, an engine auxiliary motor, and the like. The oil heat exchanger is a heat exchanger that adjusts an oil temperature by exchanging heat between engine oil or transmission oil and the engine coolant.

The EGR cooler is a heat exchanger for constituting an EGR (i.e., exhaust gas recirculation) device that circulates some of exhaust gas of the engine to an intake side so as to reduce pumping loss generated in a throttle valve. The EGR cooler adjusts a temperature of recirculation gas by exchanging heat between the recirculation gas and the engine coolant.

The throttle cooler (warmer) is a water jacket that is provided in a throttle to cool (heat) a throttle valve.

The turbo cooler is a cooler for cooling a turbocharger by exchanging heat between heat generated in the turbocharger and the engine coolant.

The engine auxiliary motor is a large motor that allows an engine belt to turn even during an engine stop. The engine auxiliary motor actuates a compressor driven by the engine belt, a water pump, and the like even in a state with no drive power of the engine 71, and is used upon activation of the engine 71.

An engine reserve tank 79 is connected to the engine radiator 74. The engine reserve tank 79 is a container (i.e., a heating medium storage section) of an atmospheric open type that stores the engine coolant. Thus, pressure on a liquid surface of the engine coolant stored in the engine reserve tank 79 is atmospheric pressure.

The engine reserve tank 79 may be configured that the pressure on the liquid surface of the engine coolant stored in the engine reserve tank 79 becomes predetermined pressure (i.e., pressure that differs from the atmospheric pressure).

A reduction in a liquid amount of the engine coolant that circulates through each of the paths can be restricted by storing a surplus coolant in the engine reserve tank 79. The engine reserve tank 79 has a function of separating air bubbles entrapped in the engine coolant from the engine coolant.

A reserve tank 80 is connected to the exterior heat exchanger path 63. A structure and a function of the reserve tank 80 are the same as those of the engine reserve tank 79.

An auxiliary heater 81 is arranged in a portion on the airflow downstream side of the heater core 51 in the casing 31 of the interior air-conditioning unit 30. The auxiliary heater 81 is an air heater that heats the air. The auxiliary heater 81 is a PTC heater (i.e., an electric heater) that has a PTC element (i.e., a positive thermistor) and generates heat when the electric power is supplied to this PTC element, so as to heat the air. The auxiliary heater 81 may be an electrothermal heater of a type that has a heating wire such as a nichrome wire and heats the air when the electric power is supplied to the heating wire.

Figure 8:
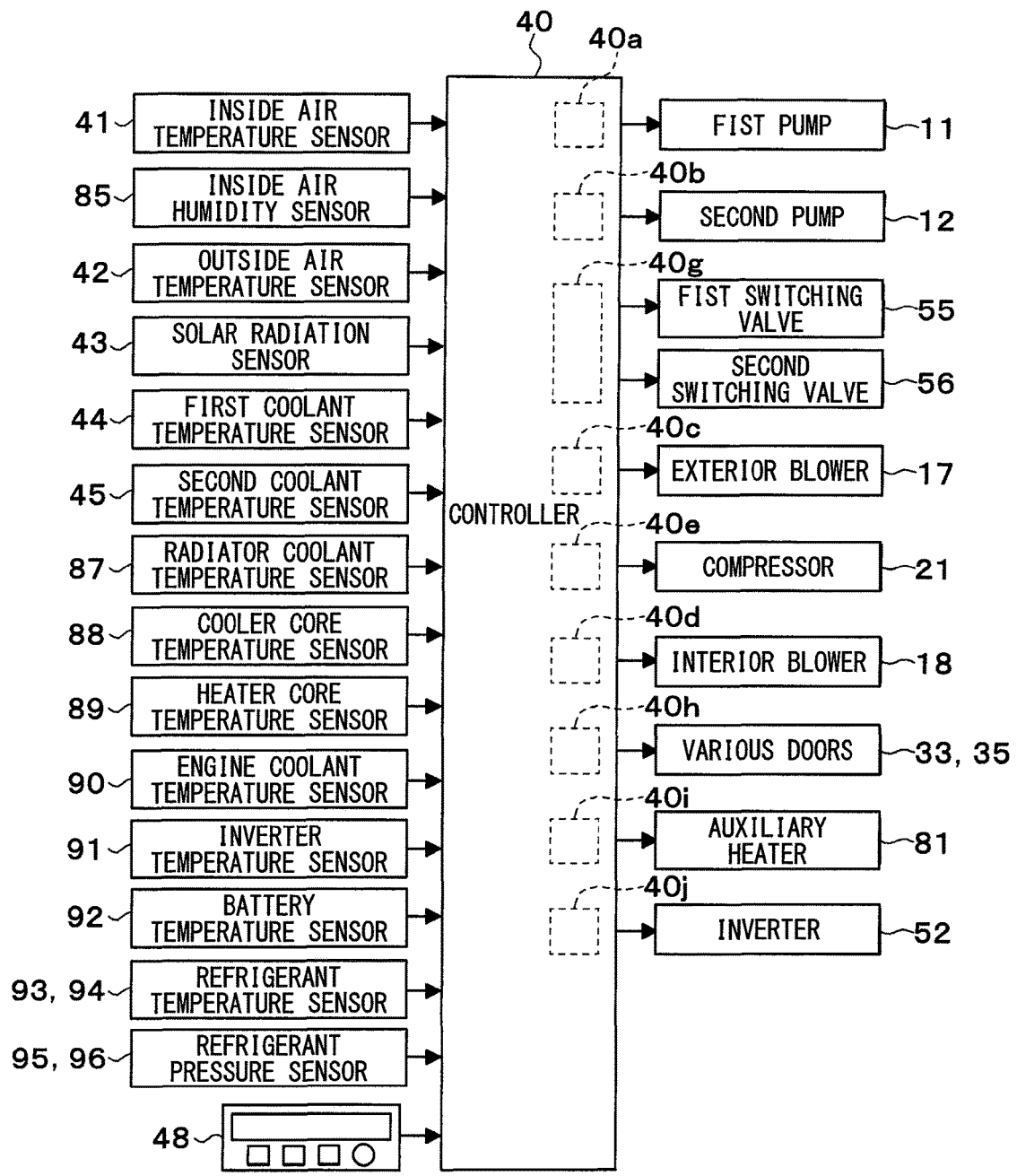
FIG. 8 is a block diagram that shows an electric control unit of the refrigeration cycle device for a vehicle in the fifth embodiment.

Next, an electric control unit of the heat management system 10 will be described on the basis of FIG. 8. In the controller 40, a configuration (hardware and software) for controlling operation of the first switching valve 55 and the second switching valve 56 constitutes a switching valve control unit 40g (i.e., a flow rate adjustment valve control unit). The switching valve control unit 40g may be configured as a separate component from the controller 40.

Together with the first switching valve 55 and the second switching valve 56, the switching valve control unit 40g constitutes a coolant flow rate control unit (i.e., a heating medium flow rate control unit) that controls the flow rate of the coolant flowing through each of the coolant distribution equipment 13, 16, 51, 52, 53, 54 and the bypass passage 26.

In the controller 40, a configuration (hardware and software) for controlling operation of various doors arranged in the casing 31 (i.e., the inside/outside air switching door 33, the air mix door 35, the blowing mode door, and the like) constitutes an air-conditioning switching control unit 40h. The air-conditioning switching control unit 40h may be configured as a separate body from the controller 40.

The air mix door 35 and the air-conditioning switching control unit 40h are the air volume ratio adjustment section that adjusts an air volume ratio of the air cooled in the cooler core 16 between the air that flows through the heater core 51 and the air that flows while bypassing the heater core 51.

The inside/outside air switching door 33 and the air-conditioning switching control unit 40h are an inside/outside air ratio adjustment section that adjusts a ratio of the air blown into the vehicle cabin between the inside air and the outside air.

In the controller 40, a configuration (hardware and software) for controlling operation of the auxiliary heater 81 (more specifically, an auxiliary heater relay 83) constitutes an auxiliary heater control unit 40i (i.e., an electric heater control unit). The auxiliary heater control unit 40i is an air heating control unit that controls heating of the air by the auxiliary heater 81.

In the controller 40, a configuration (hardware and software) that controls operation of the inverter 52 constitutes an inverter control unit 40j.

Detection signals of sensor groups, such as an inside air temperature sensor 41, an inside air humidity sensor 85, an outside air temperature sensor 42, the solar radiation sensor 43, the first coolant temperature sensor 44, the second coolant temperature sensor 45, a radiator coolant temperature sensor 87, a cooler core temperature sensor 88, a heater core temperature sensor 89, an engine coolant temperature sensor 90, an inverter temperature sensor 91, a battery temperature sensor 92, refrigerant temperature sensors 93, 94, and refrigerant pressure sensors 95, 96, are input to the input side of the controller 40.

The inside air temperature sensor 41 is the detector (i.e., the inside air temperature detector) that detects the inside air temperature (i.e., the vehicle cabin inside temperature). The inside air humidity sensor 85 is a detector (i.e., an inside air humidity detector) that detects inside air humidity.

The outside air temperature sensor 42 is the detector (i.e., the outside air temperature detector) that detects the outside air temperature (i.e., the vehicle cabin outside temperature). The solar radiation sensor 43 is the detector (i.e., the solar radiation amount detector) that detects the solar radiation amount in the vehicle cabin.

The first coolant temperature sensor 44 is the detector (i.e., the first heating medium temperature detector) that detects the temperature of the coolant flowing through the first pump path 61 (e.g., the temperature of the coolant that is drawn into the first pump 11).

The second coolant temperature sensor 45 is the detector (i.e., the second heating medium temperature detector) that detects the temperature of the coolant flowing through the second pump path 62 (e.g., the temperature of the coolant that is drawn into the second pump 12).

The radiator coolant temperature sensor 87 is a detector (i.e., an equipment-side heating medium temperature detector) that detects the temperature of the coolant flowing through the exterior heat exchanger path 63 (e.g., the temperature of the coolant that has flowed from the radiator 13).

The cooler core temperature sensor 88 is a detector (i.e., a cooler core temperature detector) that detects a surface temperature of the cooler core 16. The cooler core temperature sensor 88 is, for example, a fin thermistor that detects a temperature of the heat exchange fin in the cooler core 16, a coolant temperature sensor that detects the temperature of the coolant flowing through the cooler core 16, or the like.

The heater core temperature sensor 89 is a detector (i.e., a heater core temperature detector) that detects a surface temperature of the heater core 51. The heater core temperature sensor 89 is, for example, a fin thermistor that detects a temperature of the heat exchange fin in the heater core 51, a coolant temperature sensor that detects the temperature of the coolant flowing through the heater core 51.

The engine coolant temperature sensor 90 is a detector (i.e., an engine heating medium temperature detector) that detects the temperature of the coolant circulated through the engine cooling circuit 70 (e.g., the temperature of the coolant flowing through the inside of the engine 71).

The inverter temperature sensor 91 is a detector (i.e., an equipment-side heating medium temperature detector) that detects the temperature of the coolant flowing through the inverter path 66 (e.g., the temperature of the coolant that has flowed from the inverter 52).

The battery temperature sensor 92 is a detector (i.e., an equipment-side heating medium temperature detector) that detects the temperature of the coolant flowing through the battery temperature adjustment path 67 (e.g., the temperature of the coolant flowing into the battery temperature adjustment heat exchanger 53).

The refrigerant temperature sensors 93, 94 are a discharge-side refrigerant temperature sensor 93 that detects the temperature of the refrigerant discharged from the compressor 21 and a suction-side refrigerant temperature sensor 94 that detects the temperature of the refrigerant to be drawn into the compressor 21.

The refrigerant pressure sensors 95, 96 are a discharge-side refrigerant pressure sensor 95 that detects pressure of the refrigerant discharged from the compressor 21 and a suction-side refrigerant pressure sensor 96 that detects pressure of the refrigerant to be drawn into the compressor 21.

Next, operation in the above configuration will be described. A mode is switched among various operation modes when the controller 40 controls the operation of the first pump 11, the second pump 12, the compressor 21, the first switching valve 55, the second switching valve 56, and the like.

For example, a low-temperature-side coolant circuit (i.e., a low-temperature-side heating medium circuit), by which the coolant drawn and discharged by the first pump 11 circulates between the coolant cooling heat exchanger 14 and at least one equipment of the radiator 13, the cooler core 16, the heater core 51, the inverter 52, the battery temperature adjustment heat exchanger 53, and the coolant-coolant heat exchanger 54, is formed. Furthermore, a high-temperature-side coolant circuit (i.e., a high-temperature-side heating medium circuit), by which the coolant drawn and discharged by the second pump 12 circulates between the coolant heating heat exchanger 15 and at least one equipment of the radiator 13, the cooler core 16, the heater core 51, the inverter 52, the battery temperature adjustment heat exchanger 53, and the coolant-coolant heat exchanger 54, is formed.

The radiator 13, the cooler core 16, the heater core 51, the inverter 52, the battery temperature adjustment heat exchanger 53, and the coolant-coolant heat exchanger 54 can each be adjusted at an appropriate temperature in correspondence with a situation by switching between a case of being connected to the low-temperature-side coolant circuit and a case of being connected to the high-temperature-side coolant circuit in correspondence with the situation for each of the radiator 13, the cooler core 16, the heater core 51, the inverter 52, the battery temperature adjustment heat exchanger 53, and the coolant-coolant heat exchanger 54.

When the radiator 13 is connected to the low-temperature-side coolant circuit, a heat pump operation of a refrigeration cycle can be performed. In other words, the coolant cooled in the coolant cooling heat exchanger 14 flows through the radiator 13 in the low-temperature-side coolant circuit. Thus, the coolant absorbs heat from the outside air in the radiator 13.

Then, the coolant after absorbing heat from the outside air in the radiator 13 exchanges heat with the refrigerant of the refrigeration cycle and radiates heat in the coolant cooling heat exchanger 14. Thus, in the coolant cooling heat exchanger 14, the refrigerant of the refrigeration cycle absorbs heat from the outside air via the coolant.

The refrigerant after absorbing heat from the outside air in the coolant cooling heat exchanger 14 exchanges heat with the coolant of the high-temperature-side coolant circuit and radiates heat in the coolant heating heat exchanger 15. Thus, the heat pump operation for pumping heat of the outside air can be realized.

When the radiator 13 is connected to the high-temperature-side coolant circuit, the coolant heated in the coolant heating heat exchanger 15 flows through the radiator 13. Thus, the heat of the coolant can be radiated to the outside air in the radiator 13.

When the cooler core 16 is connected to the low-temperature-side coolant circuit, the coolant cooled in the coolant cooling heat exchanger 14 flows through the cooler core 16. Thus, the air to be blown into the vehicle cabin can be cooled in the cooler core 16. That is, the inside of the vehicle cabin can be cooled.

When the heater core 51 is connected to the high-temperature-side coolant circuit, the coolant heated in the coolant heating heat exchanger 15 flows through the heater core 51. Thus, the air to be blown into the vehicle cabin can be heated in the heater core 51. That is, the inside of the vehicle cabin can be warmed.

When the inverter 52 is connected to the low-temperature-side coolant circuit, the coolant cooled in the coolant cooling heat exchanger 14 flows through the inverter 52. Thus, the inverter 52 can be cooled. In other words, a heat pump operation for pumping waste heat of the inverter 52 can be realized.

When the inverter 52 is connected to the high-temperature-side coolant circuit, the coolant heated in the coolant heating heat exchanger 15 flows through the inverter 52. Thus, the inverter 52 can be heated (i.e., warmed).

When the battery temperature adjustment heat exchanger 53 is connected to the low-temperature-side coolant circuit, the coolant cooled in the coolant cooling heat exchanger 14 flows through the battery temperature adjustment heat exchanger 53. Thus, the battery can be cooled. In other words, a heat pump operation for pumping waste heat of the battery can be realized.

When the battery temperature adjustment heat exchanger 53 is connected to the high-temperature-side coolant circuit, the coolant heated in the coolant heating heat exchanger 15 flows through the battery temperature adjustment heat exchanger 53. Thus, the battery can be heated (i.e., warmed).

When the coolant-coolant heat exchanger 54 is connected to the low-temperature-side coolant circuit, the coolant cooled in the coolant cooling heat exchanger 14 flows through the coolant-coolant heat exchanger 54. Thus, the engine coolant can be cooled. In other words, the coolant of the low-temperature-side coolant circuit can absorbs heat from the engine coolant in the coolant-coolant heat exchanger 54. Thus, a heat pump operation for pumping waste heat of the engine 71 can be realized.

When the coolant-coolant heat exchanger 54 is connected to the high-temperature-side coolant circuit, the coolant heated in the coolant heating heat exchanger 15 flows through the coolant-coolant heat exchanger 54. Thus, the engine coolant can be heated. Therefore, the engine 71 can be heated (warmed).

The controller 40 executes a control process that is similar to that in the flowchart in FIG. 3. However, in this embodiment, a pump of either the first pump 11 or the second pump 12 that is connected to the radiator 13 and the exterior blower 17 are activated in S110 in FIG. 3.

In this embodiment, it is determined in S120 in FIG. 3 whether the coolant temperature T1 flowing through the high-temperature-side coolant circuit is lower than or equal to the first predetermined value α1. In this embodiment, the pump of either the first pump 11 or the second pump 12 that is not connected to the radiator 13 and the compressor 21 are activated in S130 in FIG. 3.

In other words, in this embodiment, when the activation request of the compressor 21 is made, the controller 40 activates the pump of either the first pump 11 or the second pump 12 that is connected to the radiator 13. The controller 40 activates the compressor 21, after activating the pump connected to the radiator 13, when it is determined or estimated that the coolant temperature T1 flowing through the high-temperature-side coolant circuit is lower than or equal to the first predetermined value $\alpha 1$.

In this way, the compressor 21 can be activated after the coolant is cooled by the radiator 13. Thus, as in the above first embodiment, the excess increase of the temperature and the pressure of the refrigerant upon the activation of the compressor 21 can be restricted.

In this embodiment, when activating the pump of either the first pump 11 or the second pump 12 that is connected to the radiator 13, the controller 40 also activates the exterior blower 17. In this way, similar to the above first embodiment, the coolant can be cooled at the early stage.

In this embodiment, it is determined in S140 in FIG. 3 whether the coolant temperature T2 in the low-temperature-side coolant circuit is lower than or equal to the second predetermined temperature $\alpha 2$.

In other words, in this embodiment, the controller 40 activates the interior blower 18 after activating the compressor 21 when it is determined or estimated that the coolant temperature T2 in the low-temperature-side coolant circuit (i.e., the temperature TR2 or the pressure PR2 of the low-pressure refrigerant) is lower than or equal to the second predetermined temperature $\alpha 2$.

According to the above features, the interior blower 18 is activated after the low-pressure refrigerant becomes at a low temperature to some extent. Thus, similar to the above first embodiment, the occupant can be prevented from feeling uncomfortable due to the nearly-uncooled warm air that is blown into the vehicle cabin.

The controller 40 executes a control process that is similar to that in the flowchart in FIG. 4. However, in this embodiment, it is determined in S210 in FIG. 4 whether the coolant temperature T1 in the high-temperature-side coolant circuit is higher than or equal to the third predetermined temperature $\alpha 3$. In this embodiment, at least one pump of the first pump 11 and the second pump 12 (i.e., the pump that is connected to the coolant cooler 14 or the coolant heater 15) and the exterior blower 17 are activated in S220 in FIG. 4.

In this embodiment, it is determined in S230 in FIG. 4 whether the coolant temperature T1 in the high-temperature-side coolant circuit is lower than or equal to the fourth predetermined value $\alpha 4$. In this embodiment, the pump that is activated in S220 and the exterior blower 17 are stopped in S240 in FIG. 4.

In other words, in this embodiment, in the case where the vehicle is in at least one state of the state that the ignition switch of the vehicle is off and the state that the engine of the vehicle is stopped and where it is determined or estimated that the one physical quantity of the temperature T1 of the coolant circulated by the first pump 11, the temperature T2 of the coolant circulated by the second pump 12, the refrigerant temperature, and the refrigerant pressure is higher than or equal to the third predetermined temperature $\alpha 3$, the controller 40 activates at least one pump of the first pump 11 and the second pump 12. The controller 40 stops the one pump, after activating at least one pump, when it is determined or estimated that the one physical quantity is lower than or equal to the fourth predetermined value $\alpha 4$ that is smaller than the third predetermined temperature $\alpha 3$.

According to the above features, the coolant can be cooled by the radiator 13 even in the state that the ignition switch of the vehicle is off or the state that the engine of the vehicle is stopped in the high-temperature environment. Thus, after the ignition switch of the vehicle is turned on, or after the engine of the vehicle is actuated, the compressor 21 can be activated promptly to start the air conditioning.

The controller 40 executes a control process that is similar to that in the flowchart in FIG. 6. However, in this embodiment, it is determined in S320 in FIG. 6 whether the coolant temperature T1 in the high-temperature-side coolant circuit is higher than or equal to the fifth predetermined value $\alpha 5$. In this embodiment, the pump of either the first pump 11 or the second pump 12 that is connected to the radiator 13 and the exterior blower 17 are activated in S330 in FIG. 6.

In other words, in this embodiment, when it is determined or estimated that one physical quantity of the temperature T1 of the coolant circulated by the first pump 11, the temperature T2 of the coolant circulated by the second pump 12, the refrigerant temperature, and the refrigerant pressure is higher than or equal to the fifth predetermined value $\alpha 5$ in the state that the ignition switch of the vehicle is on, that the engine of the vehicle is actuated, and that the compressor 21 is stopped, the controller 40 activates the pump of either the first pump 11 or the second pump 12 that is connected to the radiator 13.

According to the above features, similar to the above fourth embodiment, the coolant can be cooled by the radiator 13 even in the state that the vehicle is running and the compressor 21 is stopped. Thus, when the activation request of the compressor 21 is made, the compressor 21 can be activated promptly to start the air conditioning.

Figure 9:
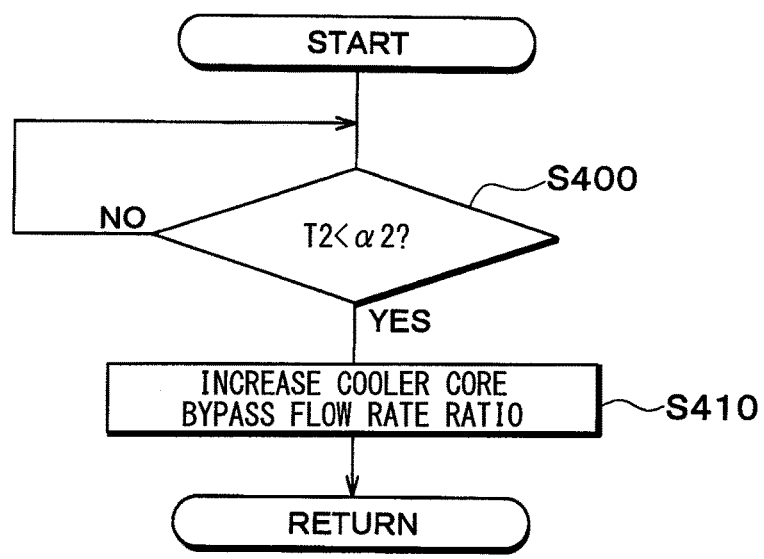
FIG. 9 is a flowchart that illustrates a control process executed by a controller of the refrigeration cycle device for a vehicle in the fifth embodiment.

FIG. 9 is a flowchart that illustrates overview of a control process executed by the controller 40. It is determined in S400 whether the temperature T2 of the low-temperature-side coolant (i.e., the coolant in the second coolant circuit C2) is lower than the second predetermined temperature $\alpha 2$.

When it is determined that the temperature T2 of the low-temperature-side coolant (i.e., the coolant in the second coolant circuit C2) is lower than the second predetermined temperature $\alpha 2$, the process proceeds to S410, and a flow rate ratio of the low-temperature-side coolant that flows through the bypass passage 26 while bypassing the cooler core 16 is increased. More specifically, the valve opening degrees of the first switching valve 55 and the second switching valve 56 are adjusted.

The first switching valve 55 and the second switching valve 56 are each a coolant flow rate ratio adjustment section (i.e., a heating medium flow rate ratio adjustment section) that adjusts the flow rate ratio between the low-temperature-side coolant flowing through the cooler core 16 and the low-temperature-side coolant flowing through the bypass passage 26 while bypassing the cooler core 16.

In other words, in this embodiment, the controller 40, after activating the compressor 21, controls the operation of the first switching valve 55 and the second switching valve 56 such that the flow rate ratio of the low-temperature-side coolant that flows through the bypass passage 26 in the case where it is determined or estimated that the low-temperature-side coolant temperature T2 is lower than the second predetermined temperature $\alpha 2$ is increased to be higher than the flow rate ratio of the low-temperature-side coolant that flows through the bypass passage 26 in the case where it is determined or estimated that the low-temperature-side coolant temperature T2 is higher than or equal to the second predetermined temperature $\alpha 2$.

In this way, the flow rate of the coolant that flows through the cooler core 16 can be reduced when the temperature of the coolant flowing through the cooler core 16 is low. Thus, the frost (i.e., the frost adhesion) on the cooler core 16 can be prevented, and cold heat loss on a surface of the cooler core 16 can be restricted.

Sixth Embodiment

In this embodiment, as shown in FIG. 10, S102, S104, S106, and S108 are added to the flowchart in FIG. 3 in the above first embodiment.

More specifically, when it is determined in S100 that the A/C switch is on, the process proceeds to S102, and the compressor 21 is activated.

It is determined in following S104 whether the coolant temperature T1 in the first coolant circuit C1 (i.e., the first circuit) is higher than or equal to the first predetermined value α1. When it is determined that the coolant temperature T1 in the first coolant circuit C1 (i.e., the first circuit) is higher than or equal to the first predetermined value α1, the process proceeds to S106. Then, after the compressor 21 is stopped, the process proceeds to S110.

On the other hand, when it is determined that the coolant temperature T1 in the first coolant circuit C1 is not higher than or equal to the first predetermined value α1, the process proceeds to S108. Then, after the first pump 11, the second pump 12, and the exterior blower 17 are activated, the process proceeds to S140.

In other words, in this embodiment, the controller 40 activates the compressor 21 when the activation request of the compressor 21 is made. The controller 40 stops the compressor 21 and activates the first pump 11, after the controller activates the compressor 21, when it is determined or estimated that the coolant temperature T1 in the first coolant circuit C1 is higher than or equal to the first predetermined value α1. The controller 40 activates the compressor 21 again, after stopping the compressor 21 and activating the first pump 11, when it is determined or estimated that the coolant temperature T1 in the first coolant circuit C1 is lower than or equal to the first predetermined value α1.

According to the above features, even in the case where the activation request of the compressor 21 is made and the compressor 21 is immediately activated, the compressor 21 is stopped, and the first pump 11 is activated to cool the coolant in the first coolant circuit C when the coolant temperature T1 in the first coolant circuit C1 is high.

When it is determined or estimated that the coolant temperature T1 in the first coolant circuit C1 is lower than or equal to the first predetermined value α1, the controller 40 activates the compressor 21. Thus, similar to the above first embodiment, the excess increase of the temperature and the pressure of the refrigerant upon the activation of the compressor 21 can be restricted.

Other Embodiments

The above embodiments can appropriately be combined. For example, various modifications can be made to the above embodiments as follows.

(1) In the above embodiments, the coolant is used as the heating medium. However, any of various types of media, such as oil, can be used as the heating medium.

The nano fluid may be used as the heating medium. The nano fluid is a fluid in which nanoparticles with particle diameters of nanometer order are mixed. In addition to the operational effect in lowering a freezing point like the coolant (so-called an antifreeze liquid) using ethylene glycol, the following operational effects can be made by mixing the nanoparticles in the heating medium.

That is, an operational effect in improving thermal conductivity in a particular temperature range, an operational effect in increasing heat capacity of the heating medium, an anticorrosive effect of a metal pipe and an operational effect in preventing deterioration of a rubber pipe, and an operational effect in increasing fluidity of the heating medium at an extremely low temperature.

Such operational effects change variously in accordance with a particle configuration, a particle shape, a compounding ratio, and an additive material of the nanoparticle.

According to the above features, the thermal conductivity can be improved. Thus, the equivalent cooling efficiency can be obtained by the heating medium in a smaller amount than the coolant using ethylene glycol.

Furthermore, the heat capacity of the heating medium can be increased. Thus, a cold heat storage quantity (stored cold heat by the sensible heat) of the heating medium itself can be increased.

Even in a state that the compressor 21 is not actuated, the temperature adjustment that includes cooling and heating of the equipment by using the stored cold heat can be performed for a certain duration by increasing the cold heat storage quantity. Thus, the power of the refrigerant cycle device 10 can be saved.

An aspect ratio of the nanoparticle is preferably 50 or more. In this way, the sufficient thermal conductivity can be obtained. It should be noted that the aspect ratio is a shape index that represents a ratio of a height x a width of the nanoparticle.

As the nanoparticle, a nanoparticle that contains any of Au, Ag, Cu, and C can be used. More specifically, as a constituent atom of the nanoparticle, an Au nanoparticle, an Ag nanowire, a CNT (i.e., a carbon nanotube), graphene, a graphite core-shell structured nanoparticle (i.e., a nanoparticle in which a structure such as a carbon nanotube is present to surround the above atom), and an Au nanoparticle containing CNT, or the like can be used.

(2) In the refrigerant circuit 20 of the above embodiments, the chlorofluorocarbon-based refrigerant is used as the refrigerant. However, a type of the refrigerant is not limited to the above, and a natural refrigerant such as carbon dioxide, a hydrocarbon refrigerant, or the like may be used.

In addition, the refrigerant circuit 20 in the above embodiments constitutes the subcritical refrigeration cycle in which the pressure of the high-pressure side refrigerant does not exceed the critical pressure of the refrigerant. However, the refrigerant circuit 20 may constitute a supercritical refrigeration cycle in which the pressure of the high-pressure side refrigerant exceeds the critical pressure of the refrigerant.

(3) In the above embodiments, an example in which the refrigeration cycle device 10 is applied to the hybrid vehicle. However, the refrigeration cycle device 10 may be applied to an electric vehicle or the like that does not include the engine and obtains the drive power for running the vehicle from the electric motor for travel.

(4) In the above fifth embodiment, in the configuration that the first coolant circuit C1 and the second coolant circuit C2 are connected via the switching valves 55, 56, when it is determined that the coolant temperature T2 in the second coolant circuit C2 is lower than or equal to the second predetermined temperature α2, the flow rate ratio of the coolant flowing through the bypass passage 26 is increased. However, also in the configuration that the first coolant circuit C1 and the second coolant circuit C2 are independent from each other as in the above first embodiment, when it is determined that the coolant temperature T2 in the second coolant circuit C2 is lower than or equal to the second predetermined temperature α2, the flow rate ratio of the coolant flowing through the bypass passage may be increased.

For example, a bypass passage and a bypass passage opening/closing valve may be added to the above first embodiment. In this case, the controller 40 may increase the flow rate ratio of the coolant that flows through the bypass passage when it is determined that the coolant temperature T2 in the second coolant circuit C2 is lower than or equal to the second predetermined temperature α2.

In this configuration, the bypass passage is a path through which the coolant in the second coolant circuit C2 flows while bypassing the cooler core 16. The bypass passage opening/closing valve is a flow rate ratio adjustment section (i.e., a heating medium flow rate ratio adjustment section) that adjusts a flow rate ratio between the coolant in the second coolant circuit C2 flowing through the cooler core 16 and the coolant in the second coolant circuit C2 flowing through the bypass passage in the second coolant circuit C2.

What is claimed is:

1. A refrigeration cycle device for a vehicle comprising:
   a compressor drawing and discharging a refrigerant;
   a first pump drawing and discharging a first heating medium;
   a high-pressure side heat exchanger that heats the first heating medium by exchanging heat between a high-pressure refrigerant discharged from the compressor and the first heating medium;
   a heating medium-outside air heat exchanger that exchanges heat between the first heating medium and outside air; and
   a controller controlling operation of the compressor and the first pump, wherein
   the controller activates the first pump when an activation request of the compressor is made, and
   the controller activates the compressor, after activating the first pump, when it is determined or estimated that a temperature of the first heating medium is lower than or equal to a first predetermined value.

2. The refrigeration cycle device for a vehicle according to claim 1 further comprising:
   a blower generating an air flow that flows toward inside of a vehicle cabin;
   a pressure reducer reducing pressure of the high-pressure refrigerant that is after exchanging heat in the high-pressure side heat exchanger; and
   an air cooler cooling the air by using cold heat of a low-pressure refrigerant that is after being decompressed by the pressure reducer, wherein
   the controller activates the blower, after activating the compressor, when it is determined or estimated that a temperature of the low-pressure refrigerant is lower than or equal to a second predetermined value.

3. The refrigeration cycle device for a vehicle according to claim 1 further comprising:
   a blower generating an air flow that flows toward inside of a vehicle cabin;
   a pressure reducer reducing pressure of the high-pressure refrigerant that is after exchanging heat in the high-pressure side heat exchanger;
   a second pump drawing and discharging a second heating medium;
   a low-pressure side heat exchanger cooling the second heating medium by exchanging heat between the second heating medium and a low-pressure refrigerant that is after being decompressed by the pressure reducer; and
   an air-cooling heat exchanger that cools the air by exchanging heat between the air and the second heating medium that is cooled by the low-pressure side heat exchanger.

4. The refrigeration cycle device for a vehicle according to claim 3, wherein,
   the controller activates the blower, after activating the compressor, when it is determined or estimated that a temperature of the second heating medium is lower than or equal to a second predetermined value.

5. The refrigeration cycle device for a vehicle according to claim 3 further comprising:
   a bypass passage through which the second heating medium flows while bypassing the air-cooling heat exchanger; and
   a heating medium flow rate ratio adjustment section that adjusts a flow rate ratio between the second heating medium flowing through the air-cooling heat exchanger and the second heating medium flowing through the bypass passage, wherein
   the controller, after activating the compressor, controls operation of the heating medium flow rate ratio adjustment section such that the flow rate ratio of the second heating medium flowing through the bypass passage in a case where it is determined or estimated that the temperature of the second heating medium is lower than the second predetermined value is increased to be higher than the flow rate ratio of the second heating medium flowing through the bypass passage in a case where it is determined or estimated that the temperature of the second heating medium is higher than or equal to the second predetermined value.

6. The refrigeration cycle device for a vehicle according to claim 1, wherein
   in at least one state of a state that an ignition switch of a vehicle is off and a state that an engine of the vehicle is stopped, the controller (i) activates the first pump when it is determined or estimated that the temperature of the first heating medium is higher than or equal to a third predetermined value, and (ii) stops the first pump, after activating the first pump, when it is determined or estimated that the temperature of the first heating medium is lower than or equal to a fourth predetermined value that is smaller than the third predetermined value.

7. The refrigeration cycle device for a vehicle according to claim 1, wherein
   in a state that the ignition switch of the vehicle is on, that the engine of the vehicle is actuated, and that the compressor is stopped, the controller activates the first pump when it is determined or estimated that the temperature of the first heating medium is higher than or equal to a fifth predetermined value.

8. The refrigeration cycle device for a vehicle according to claim 1 further comprising
   an outside air blower blowing outside air to the heating medium-outside air heat exchanger, wherein
   the controller further activates the outside air blower when activating the first pump.

9. A refrigeration cycle device for a vehicle comprising:
   a compressor drawing and discharging a refrigerant;
   a first pump drawing and discharging a first heating medium;
   a high-pressure side heat exchanger that heats the first heating medium by exchanging heat between the first heating medium and a high-pressure refrigerant discharged from the compressor;

a heating medium-outside air heat exchanger exchanging heat between the first heating medium and outside air; and a controller controlling operation of the compressor and the first pump, wherein in at least one state of a state that an ignition switch of a vehicle is off and a state that an engine of the vehicle is stopped, the controller (i) activates the first pump when it is determined or estimated that a temperature of the first heating medium is higher than or equal to a third predetermined value, and (ii) stops the first pump, after activating the first pump, when it is determined or estimated that the temperature of the first heating medium is lower than or equal to a fourth predetermined value that is smaller than the third predetermined value.

10. A refrigeration cycle device for a vehicle comprising:
a compressor drawing and discharging a refrigerant;
a high-pressure side heat exchanger that makes a high-pressure refrigerant discharged from the compressor exchange heat;
a pump drawing and discharging a heating medium;
a pressure reducer reducing pressure of the high-pressure refrigerant that is after exchanging heat in the high-pressure side heat exchanger;
a low-pressure side heat exchanger that cools the heating medium by exchanging heat between the heating medium and a low-pressure refrigerant that is after decompressed by the pressure reducer;
a blower generating an air flow that flows toward inside of a vehicle cabin;
an air-cooling heat exchanger cooling the air by exchanging heat between the air and the heating medium that is cooled by the low-pressure side heat exchanger; and
a controller controlling operation of the compressor and the pump, wherein
the controller activates the compressor when an activation request of the compressor is made, and
the controller activates the blower, after activating the compressor, when it is determined or estimated that a temperature of the heating medium is lower than or equal to a predetermined value.

11. A refrigeration cycle device for a vehicle comprising:
a compressor drawing and discharging a refrigerant;
a first pump and a second pump drawing and discharging a heating medium;
a high-pressure side heat exchanger that heats the heating medium by exchanging heat between the heating medium and a high-pressure refrigerant discharged from the compressor;
a heating medium-outside air heat exchanger that exchanges heat between the heating medium and outside air;
a switching section switching a connection of the heating medium-outside air heat exchanger between the first pump and the second pump; and
a controller controlling operation of the compressor, the first pump, and the second pump, wherein
the controller activates a pump of either the first pump or the second pump that is connected to the heating medium-outside air heat exchanger when an activation request of the compressor is made, and
the controller activates the compressor, after activating the pump that is connected to the heating medium-outside air heat exchanger, when it is determined or estimated that a temperature of the heating medium is lower than or equal to a first predetermined value.

12. The refrigeration cycle device for a vehicle according to claim 11 further comprising:
a blower generating an air flow that flows toward inside of a vehicle cabin;
a pressure reducer reducing pressure of the high-pressure refrigerant that is after exchanging heat in the high-pressure side heat exchanger; and
an air cooler cooling the air by using cold heat of a low-pressure refrigerant that is after being decompressed by the pressure reducer, wherein,
the controller activates the blower, after activating the compressor, when it is determined or estimated that a temperature of the low-pressure refrigerant is lower than or equal to a second predetermined value.

13. The refrigeration cycle device for a vehicle according to claim 11, wherein
in at least one state of a state that an ignition switch of a vehicle is off and a state that an engine of the vehicle is stopped:
the controller activates at least one pump of the first pump and the second pump when it is determined or estimated that one physical quantity of the temperature of the heating medium circulated by the first pump, the temperature of the heating medium circulated by the second pump, a refrigerant temperature, and a refrigerant pressure is higher than or equal to a third predetermined value; and
the controller stops at least one pump, after activating the at least one pump, when it is determined or estimated that the one physical quantity is lower than or equal to a fourth predetermined value that is smaller than the third predetermined temperature.

14. The refrigeration cycle device for a vehicle according to claim 11, wherein
in a state that (i) the ignition switch of the vehicle is on, (ii) the engine of the vehicle is actuated, and (iii) the compressor is stopped, the controller activates the pump of either the first pump or the second pump that is connected to the heating medium-outside air heat exchanger when it is determined or estimated that one physical quantity of the temperature of the heating medium circulated by the first pump, the temperature of the heating medium circulated by the second pump, the refrigerant temperature, and the refrigerant pressure is higher than or equal to a fifth predetermined value.

15. The refrigeration cycle device for a vehicle according to claim 11 further comprising
an outside air blower blowing outside air to the heating medium-outside air heat exchanger, wherein
the controller also activates the outside air blower when activating the pump of either the first pump or the second pump that is connected to the heating medium-outside air heat exchanger.

16. A refrigeration cycle device for a vehicle comprising:
a compressor drawing and discharging a refrigerant;
a first pump and a second pump drawing and discharging a heating medium;
a high-pressure side heat exchanger that heats the heating medium by exchanging heat between the heating medium and a high-pressure refrigerant discharged from the compressor;
a heating medium-outside air heat exchanger that exchanges heat between the heating medium and outside air;
a switching section switching a connection of the heating medium-outside air heat exchanger between the first pump and the second pump; and a controller controlling operation of the compressor, the first pump, and the second pump, wherein, in at least one state of a state that an ignition switch of a vehicle is off and a state that an engine of the vehicle is stopped:

the controller activates a pump of either the first pump or the second pump that is connected to the heating medium-outside air heat exchanger when it is determined or estimated that a temperature of the heating medium is higher than or equal to a third predetermined value; and the controller, after activating the pump that is connected to the heating medium-outside air heat exchanger, stops the pump of either the first pump or the second pump that is connected to the heating medium-outside air heat exchanger when it is determined or estimated that the temperature of the heating medium is higher than or equal to a fourth predetermined value that is smaller than the third predetermined value.

17. A refrigeration cycle device for a vehicle comprising:
a compressor drawing and discharging a refrigerant;
a pump drawing and discharging a heating medium;
a high-pressure side heat exchanger that heats the heating medium by exchanging heat between the heating medium and a high-pressure refrigerant discharged from the compressor;
a heating medium-outside air heat exchanger that exchanges heat between the heating medium and outside air; and
a controller controlling operation of the compressor and the pump, wherein the controller:
activates the compressor when an activation request of the compressor is made;
stops the compressor and activates the pump when it is determined or estimated that a temperature of the heating medium is higher than or equal to a first predetermined value after activating the compressor; and
activates the compressor again when it is determined or estimated that the temperature of the heating medium is lower than the first predetermined value after stopping the compressor and activating the pump.

* * * * *